US011200741B1

(12) United States Patent
Price et al.

(10) Patent No.: US 11,200,741 B1
(45) Date of Patent: Dec. 14, 2021

(54) GENERATING HIGH FIDELITY SPATIAL MAPS AND POSE EVOLUTIONS

(71) Applicant: Microsoft Technology Licensing, LLC, Redmond, WA (US)

(72) Inventors: Raymond Kirk Price, Redmond, WA (US); Christopher Douglas Edmonds, Carnation, WA (US); Michael Bleyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/116,383

(22) Filed: Dec. 9, 2020

(51) Int. Cl.
*G06T 19/00* (2011.01)
*G06K 9/00* (2006.01)
*G06F 3/01* (2006.01)
*H04L 29/06* (2006.01)
*G06T 17/20* (2006.01)
*G06T 7/73* (2017.01)

(52) U.S. Cl.
CPC ............ *G06T 19/003* (2013.01); *G06F 3/012* (2013.01); *G06K 9/00201* (2013.01); *G06T 7/73* (2017.01); *G06T 17/20* (2013.01); *G06T 19/006* (2013.01); *H04L 67/38* (2013.01)

(58) Field of Classification Search
None
See application file for complete search history.

(56) References Cited

U.S. PATENT DOCUMENTS

| | | | | |
|---|---|---|---|---|
| 2015/0227778 A1* | 8/2015 | Cervantes | ................. | G06T 7/70 348/47 |
| 2018/0285052 A1* | 10/2018 | Eade | .................... | G03H 1/0005 |
| 2019/0102928 A1* | 4/2019 | Blackshaw | ............. | A63F 13/26 |
| 2019/0287311 A1* | 9/2019 | Bhatnagar | ............... | G06T 15/08 |
| 2019/0371028 A1* | 12/2019 | Harrises | ............ | G02B 27/0101 |

* cited by examiner

*Primary Examiner* — Martin Mushambo
(74) *Attorney, Agent, or Firm* — Workman Nydegger

(57) ABSTRACT

Techniques for generating a unified map and for determining a pose evolution are disclosed. A HMD generates images of an environment. Feature points can be identified from those images. The images and/or the feature points are used to generate a map of a previously unmapped environment. The images and/or feature points are also used to generate a pose evolution of the HMD. It may be the case that another map converges with the first map. If that is the case, then a unified map is generated by linking the two maps at the convergence point. The pose evolutions may also be linked. After action reviews are improved through the use of the unified map and pose evolution.

20 Claims, 30 Drawing Sheets

GENERATING HIGH FIDELITY SPATIAL MAPS AND POSE EVOLUTIONS

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

HMDs are used in many different scenarios and can record content while a user is engaging in an activity. After the activity is completed, that content can be reviewed and critiqued during an "after action review." After action reviews are highly beneficial because they help users continually improve their skills by identifying areas of deficiency, weakness, strength, or excellence. Providing meaningful feedback in an after action review is highly beneficial to long term improvement. The ability to generate that feedback, however, is a difficult process. Involving an HMD helps with the ability to provide this feedback. For example, the HMD is able to record content while the user is engaging in the activity. That content can be reviewed later during the after action review. Although displaying that content does provide substantial benefits, the sheer breadth of information recorded by a HMD is almost unmanageable and, if left alone, may not provide the type of meaningful feedback that is desired during an after action review. Accordingly, what is needed is an improved technique for monitoring activities and for providing meaningful and structured feedback regarding those activities during an after action review from information generated by a HMD.

Another issue that arises pertains to the ability to map an environment. Traditionally, in order to provide feedback during an after action review, the environment in which the HMD was being used had to be mapped beforehand to enable the HMD to have situational awareness and context. One can imagine the difficulties involved with having to map an environment before an event is to occur. If the environment were not mapped beforehand, then the ability to provide meaningful feedback was severely hampered. What is needed, therefore, is an improved technique for generating maps "on the fly" while an event is occurring without having to map the environment beforehand.

Traditional techniques also rely heavily on global positioning system (GPS) usage in order to track the location of devices. Problems arise with these traditional techniques, however, when the systems are used indoors where GPS signals may not be adequately strong. Yet another problem with traditional techniques involves how to perform map or mesh alignment on the fly while the systems are being used. Accordingly, there are numerous areas where the technical field can be improved. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., head mounted devices, hardware storage devices, etc.), and methods for mapping an environment and for generating a pose evolution.

In some embodiments, a head mounted device (HMD) is configured to generate images in order to map an environment in which the HMD is located and to determine a pose evolution of at least the HMD over a time period during which the images were generated. These poses (e.g., detailing the XYZ position of the HMD) as well as the yaw pitch and roll can be used to determine where the user is positioned and oriented over time. The HMD generates images of the environment, which is a previously unmapped environment. Based on those images, the HMD generates a three-dimensional (3D) map of the environment. Also, based on the images, the HMD determines a pose evolution of at least the HMD over a time period during which the images were generated. The HMD then transmits the 3D map and the pose evolution to an external server.

In some embodiments, the HMD generates images of the environment. The HMD also identifies multiple feature points within each of the images. The HMD then generates one or more feature point descriptors for each feature point. As a consequence, multiple feature point descriptors are generated. The HMD transmits data comprising the feature points and the feature point descriptors to an external server. The feature points and the feature points descriptors are configured to enable a three-dimensional (3D) map of the environment to be generated and to enable a pose evolution of the HMD to be generated.

In some embodiments, a computer system (e.g., a server computer) is configured process images in order to map an environment in which a head mounted device (HMD) is located and to determine a pose evolution of at least the HMD over a time period during which the images were generated. The system receives, from a HMD, at least one of: 1) first data comprising images of an environment in which the HMD is located or 2) second data comprising feature points identified from images of the environment, where each feature point is associated with a corresponding one or more feature point descriptors. In response to receiving the first data, the system uses the images to generate a three-dimensional (3D) map of the environment and uses the images to determine a pose evolution of the HMD over a time period during which the images were generated. In response to receiving the second data, the system uses the feature points to generate the 3D map of the environment and uses the feature points to determine the pose evolution of the HMD over the same time period. The system also identifies a path convergence within the 3D map. The path convergence is a point within the 3D map where a second 3D map is also mapped to. Also, the second map is associated with a second HMD. The system generates a unified map by linking the 3D map with the second 3D map at the path convergence and by linking the pose evolution of the HMD with a second pose evolution of the second HMD.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
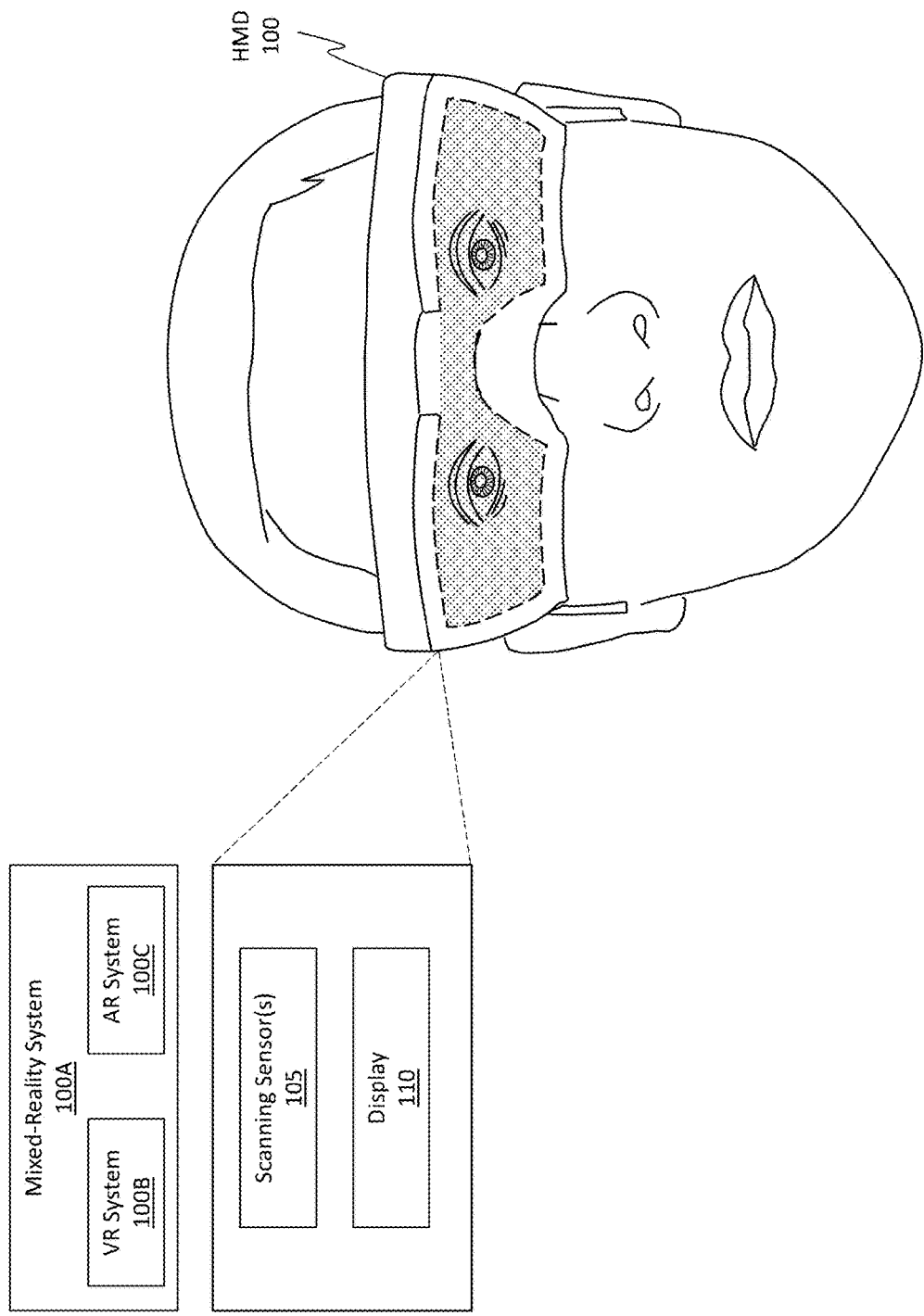
FIG. 1 illustrates an example head mounted device (HMD).

Embodiments disclosed herein relate to systems, devices (e.g., HMDs, hardware storage devices, etc.), and methods for mapping an environment and for generating a pose evolution.

In some embodiments, a HMD generates images of a previously unmapped environment. Based on those images, a 3D map of the environment is generated. Also, based on the images, a pose evolution of the HMD is generated. The 3D map and the pose evolution are transmitted to an external server.

In some embodiments, the HMD generates images and identifies multiple feature points within each of the images. Feature point descriptors for each feature point are determined. Data comprising the feature points and the feature point descriptors is transmitted to an external server to enable the server to generate a 3D map of the environment and to generate a pose evolution of the HMD.

In some embodiments, a computer system (e.g., a server computer) receives, from a HMD, at least one of: 1) first data comprising images of an environment or 2) second data comprising feature points identified from images and further comprising feature point descriptors. In response to receiving the first data, the system uses the images to generate a 3D map of the environment and to determine a pose evolution of the HMD. In response to receiving the second data, the system uses the feature points and descriptors to generate the 3D map of the environment and to determine the pose evolution of the HMD. The system identifies a path convergence between the 3D map and a second 3D map associated with a second HMD. The system generates a unified map by linking those two maps together at the path convergence. Beneficially, the combined paths of the multiple HMDs can be used to better understand the users' positions over time (e.g., for review during an after action review).

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Significant benefits and improvements are achieved via practice of the disclosed principles. In particular, the embodiments substantially improve "after action reviews." An "after action review" refers to a structured meeting that extracts lessons learned from an event. That is, any number of entities may be involved in accomplishing a particular endeavor, such as a training exercise, a real-action event (e.g., a paintball game), a first responder emergency, and so forth. After this event is over, it is often highly beneficial to review what occurred during the event, which entities were involved in the event, how those entities performed, how the operations can be improved, and so forth. Conducting this review is performed in the "after action review." By facilitating an after action review, improvements and efficiencies can be identified, accolades can be awarded, and feedback can be provided for perpetual learning.

The disclosed embodiments help facilitate after action reviews via the use of a HMD. In particular, the HMD is configured to generate images while the event or activity is occurring. These images will be used not only to progressively build up a map (e.g., a 2D map and/or a 3D map of the environment) but they will also be used to generate a "pose evolution" of the HMD over the time period spanning the event. As used herein, a "pose evolution" refers to a timeline of recorded poses that the HMD was in. The pose evolution may include actual imagery of the HMD at a particular point in time. The pose evolution may include map information with directional indicators to visually illustrate the orientation of the HMD at a particular point in time. The pose evolution may include other data as well, as will be discussed in more detail later.

This pose evolution can then be reviewed and critiqued during the after action review. Providing the pose evolution substantially increases the amount of information reviewers have during the after action review, thereby improving the ability of the reviewers to provide meaningful feedback. An example will be helpful.

Suppose a number of paintball players are engaged in a professional paintball event. These paintball players are also wearing HMDs. While the event is in progress, the HMDs capture images of the players' play. The images are used to generate pose evolutions of the players over time.

Reviewers will be able to review the pose evolutions to determine the reaction speeds and times of the players and to gauge the players' situational awareness. The reviewers will be able to provide meaningful critique based on real data in order to help the players continually improve their abilities. As will now be discussed in detail, practice of the disclosed principles will significantly improve the effectiveness of after action reviews as well as the generation of environmental maps.

Additionally, the disclosed embodiments can operate without reliance on a GPS signal to map the environment. Notably, GPS is often not adequately available in indoor environments, where the signal either fades to unusable levels or where the signal is entirely nonexistent. By not relying on GPS signals to derive maps, the embodiments can effectively and easily transition between use in an indoor environment (i.e. mapping indoor areas) and use in an outdoor environments (i.e. mapping outdoor areas). The embodiments also allow users to work in jammed and/or spoofed environments.

It should also be noted that Simultaneous Location And Mapping (SLAM) techniques have been used in the past for location and mapping operations. The disclosed embodiments improve how mesh alignment and map generating are performed on the fly (i.e. in real time) and further improve how pose trajectories are aligned for different users over time in previously unmapped environments.

Example MR Systems and HMDs

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, generate pose evolutions (to be discussed in more detail later), and/or generate any kind of images of the environment (e.g., by generating a 3D representation of the environment). Scanning sensor(s) 105 may comprise any number or any type of scanning devices, without limit.

In some embodiments, scanning sensor(s) 105 include visible light camera(s), low light camera(s), thermal imaging camera(s), potentially ultraviolet (UV) camera(s), and potentially a dot illuminator. Any other type of camera or camera system (e.g., depth cameras, time of flight cameras, virtual cameras, depth lasers, etc.) may be included among the scanning sensor(s) 105.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types. Images or image content generated by the scanning sensor(s) 105 may then be displayed on the display 110 of the HMD 100 for the user to view and interact with.

It should be noted that any number of cameras (i.e. scanning sensors) may be provided on the HMD 100 for each of the different camera types. That is, the visible light camera(s) may include 1, 2, 3, 4, 5, 6, 7, 8, 9, 10, or more than 10 cameras. Often, however, the number of cameras is at least 2 so the HMD 100 can perform stereoscopic depth matching. Similarly, the low light camera(s), the thermal imaging camera(s), and the UV camera(s) may each respectively include 1, 2, 3, 4, 5, 6, 7, 8, 9, 10, or more than 10 corresponding cameras.

Figure 2:
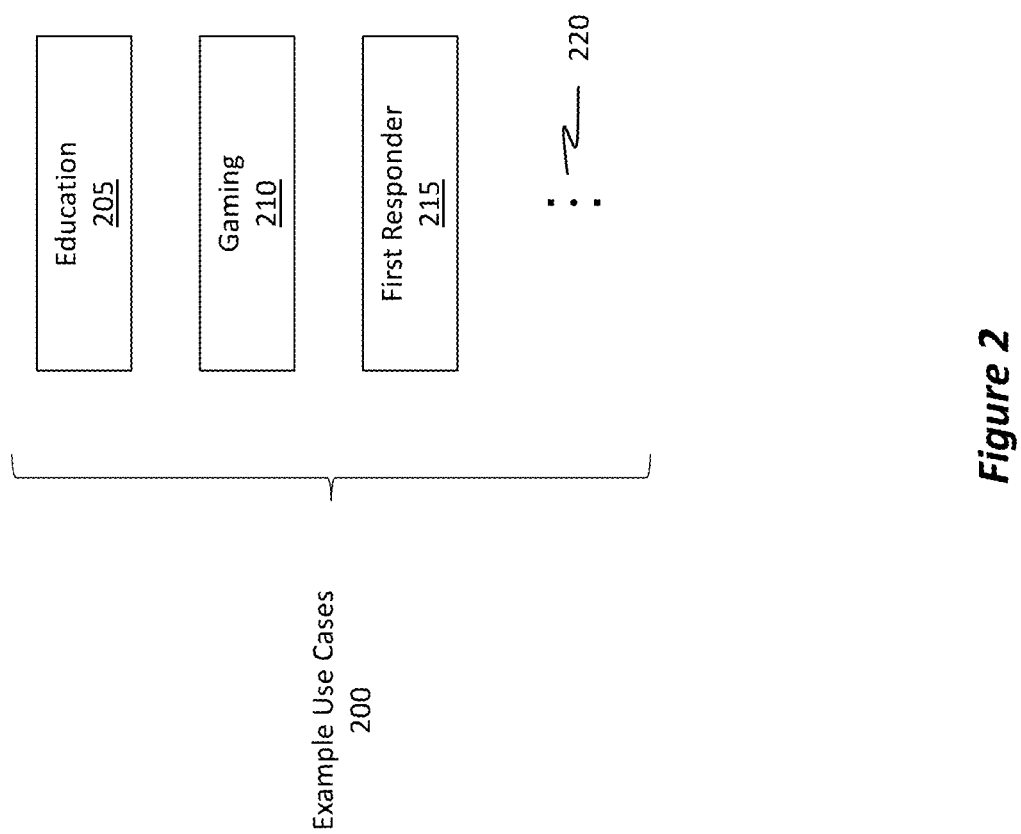
FIG. 2 illustrates various example use cases in which a HMD may be used.

The HMD 100 can be used in an innumerable number of ways and in an innumerable number of scenarios. FIG. 2 shows some example use cases 200 in which the HMD 100 can be used. To illustrate, the example use cases 200 include education 205 scenarios, gaming 210 scenarios, and even first responder 215 scenarios. The ellipsis 220 demonstrates how the HMD 100 can be used in other scenarios as well.

Figure 3:
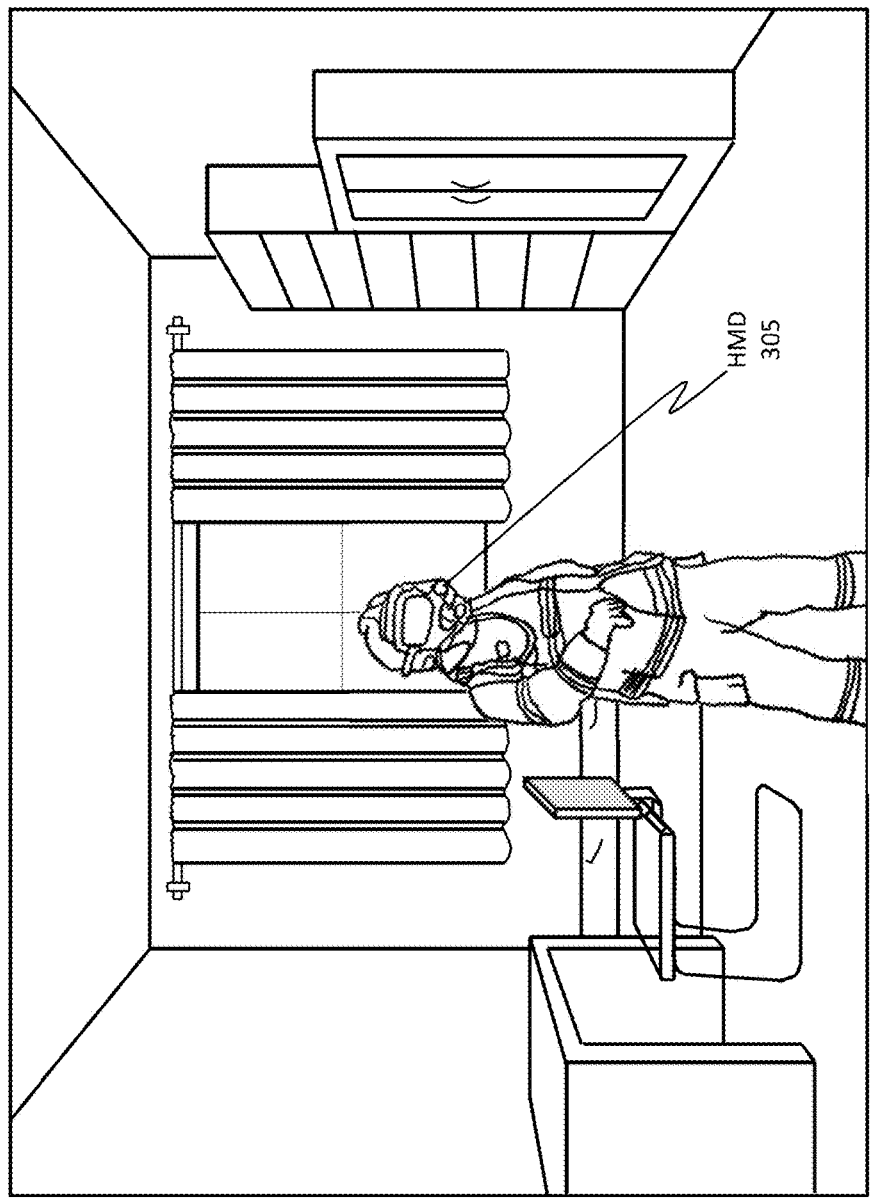
FIG. 3 illustrates a first responder training environment in which a HMD is being used.

FIG. 3 shows an example of a first responder training environment 300 in which an HMD 305 is being used. This example scenario may fall under the first responder 215 scenario mentioned in FIG. 2. Here, the first responder is wearing the HMD 305 to perform real rescue missions or perhaps simulated training exercises.

Figure 4:
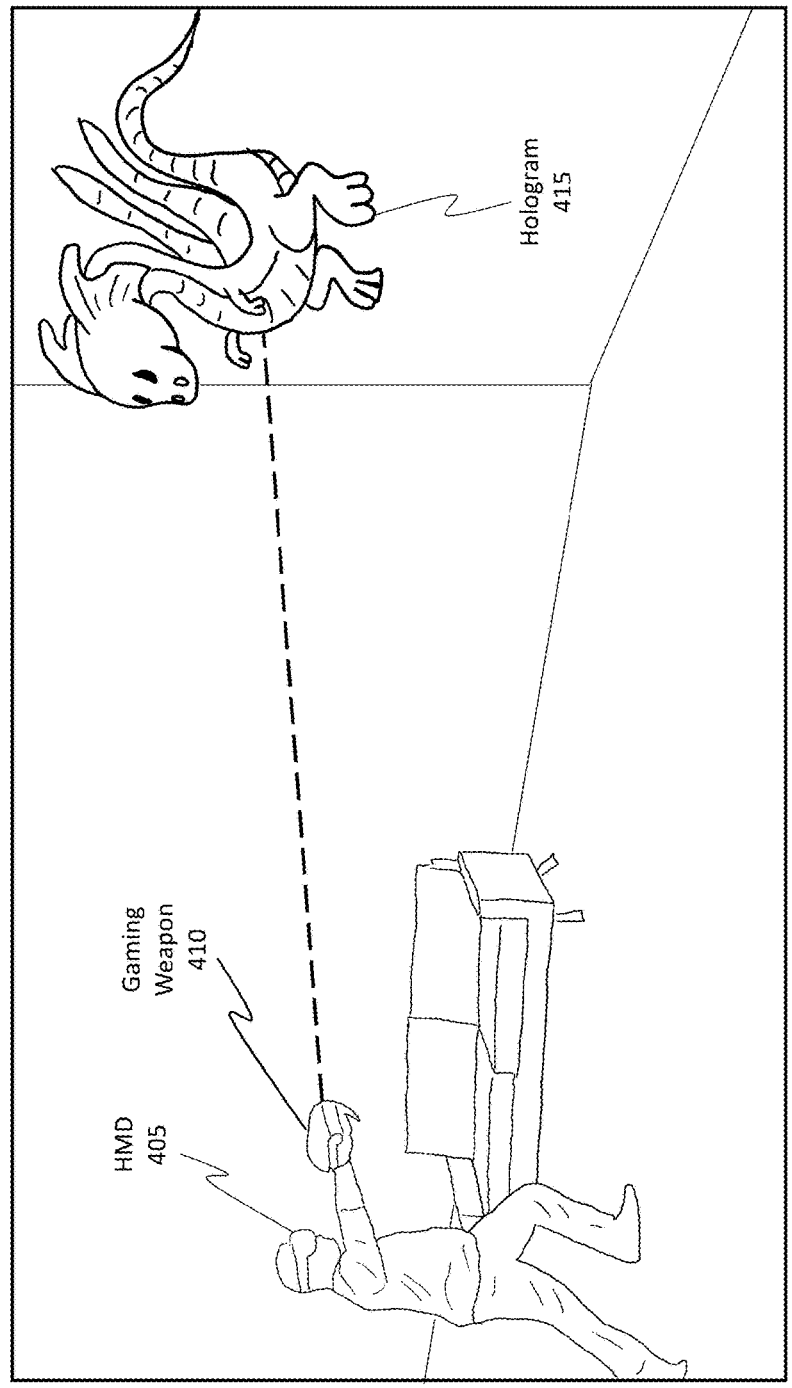
FIG. 4 illustrates a gaming environment in which a HMD is being used.
Figure 5:
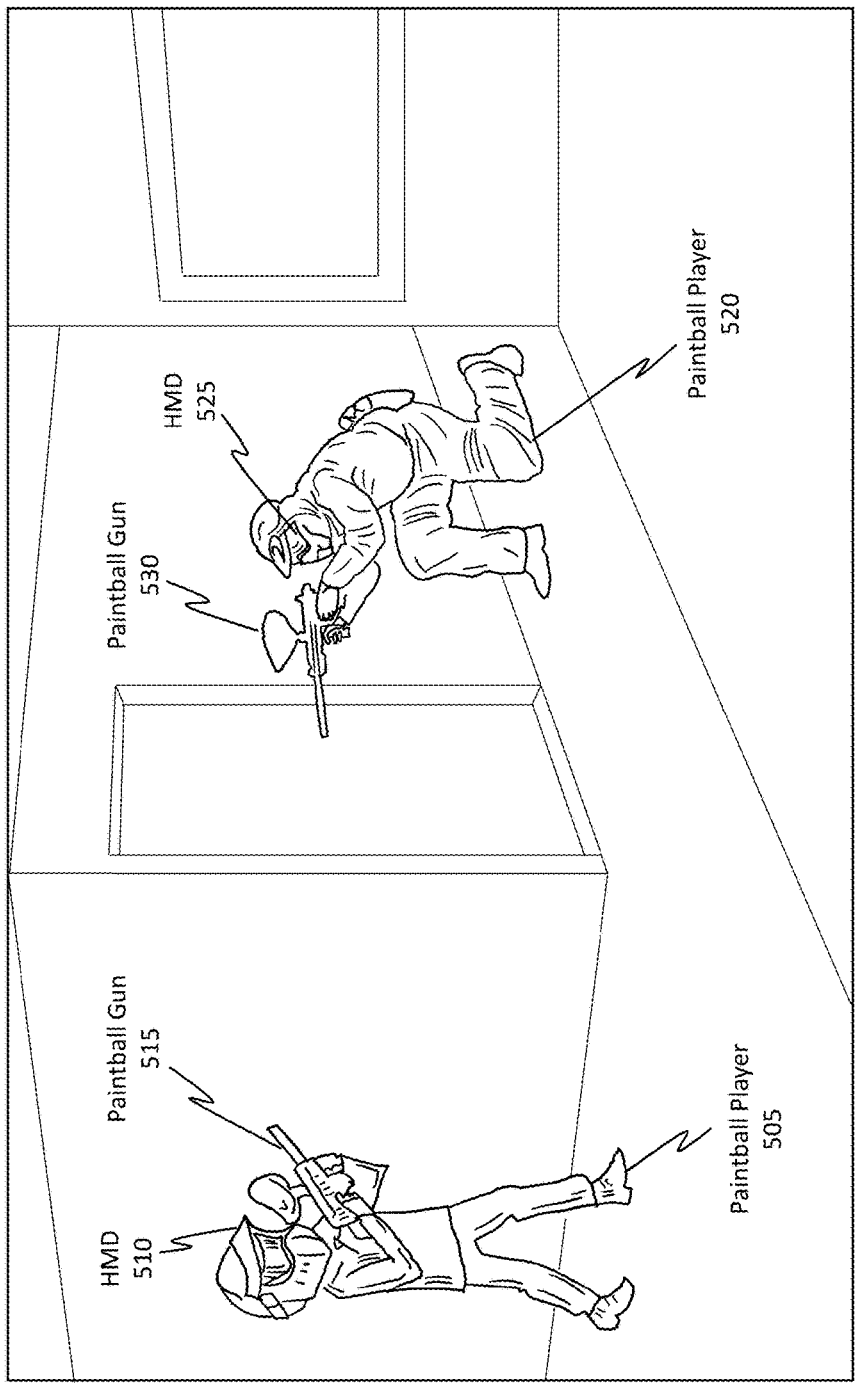
FIG. 5 illustrates another gaming environment in which a HMD is being used.

FIGS. 4 and 5 illustrate scenarios where a HMD is being used in a gaming environment. In particular, FIG. 4 shows a gaming environment 400 where a user is wearing a HMD 405 and is using a gaming weapon 410 to attack a hologram 415 (e.g., a dangerous dragon).

FIG. 5 shows another example gaming environment 500 in which a paintball player 505 is wearing a HMD 510 and is holding a paintball gun 515. Another paintball player 520 is also wearing a HMD 525 and is holding a paintball gun 530. Here, the two paintball players are playing a paintball game against one another, and the HMDs are providing support for that game. As an example, the HMDs may be displaying map information, player information, ammo information, and so forth.

Figure 6:
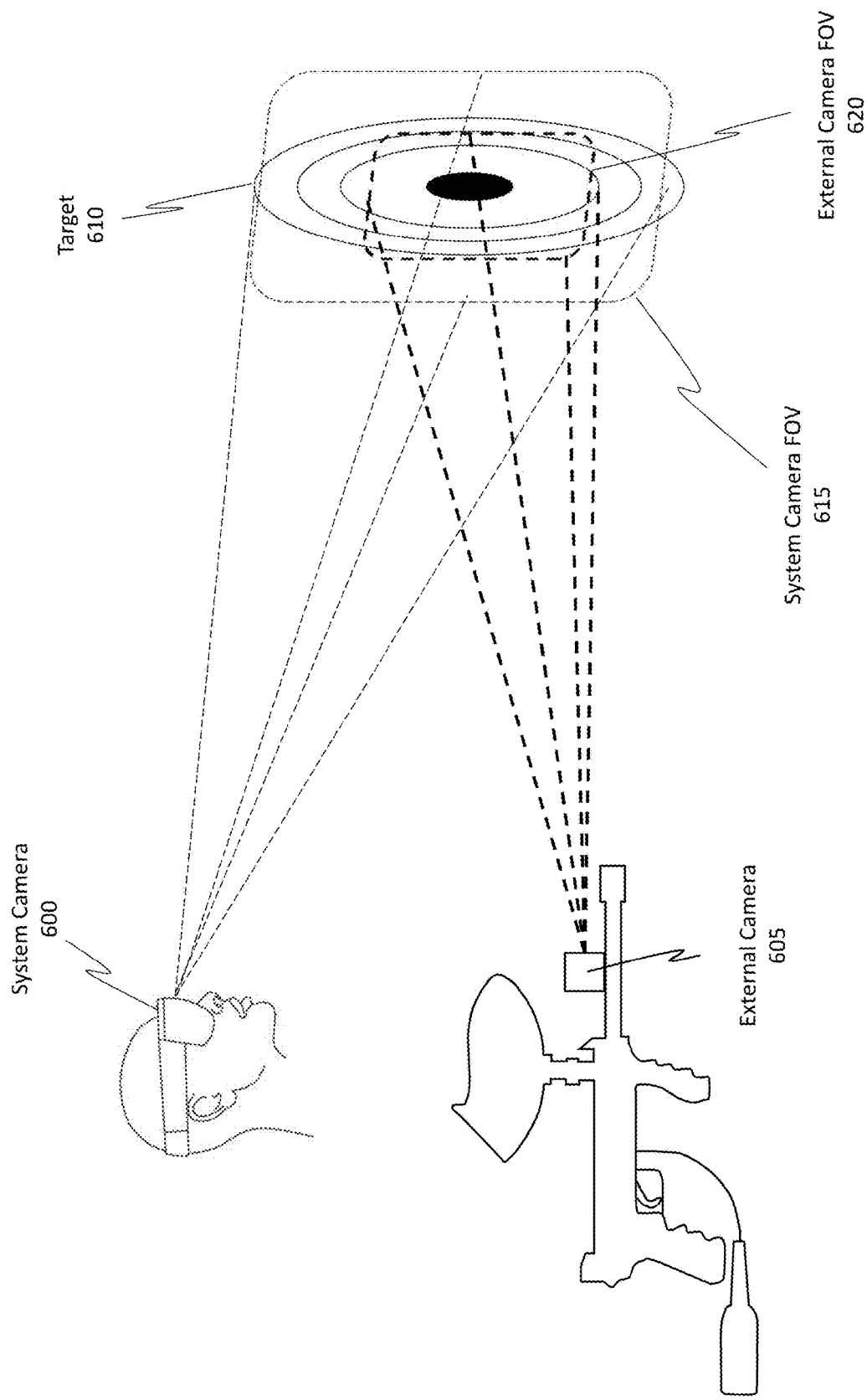
FIG. 6 illustrates how a HMD can include cameras that can operate in conjunction with external cameras.

FIG. 6 shows how a HMD can include a system camera 600 and how an external camera 605 can be disposed on a tool or gaming weapon. In this example scenario, the system camera 600 and the external camera 605 are both aimed at a target 610, as shown by the overlapping field of view (FOV), such as system camera FOV 615 (i.e. the FOV of the system camera 600) and the external camera FOV 620 (i.e. the FOV of the external camera 605). Both FOVs are directed toward the target 610. The HMD is able to display imagery of the external camera FOV 620 in order to facilitate aiming the gaming weapon. That is, because the optical axis of the external camera 605 is aligned so as to correspond to the aiming direction of the gaming weapon, the viewpoint provided by the external camera 605 mimics where the gaming weapon is being aimed. By displaying that content on the user's HMD, the user can discern or view where the gaming weapon is being aimed.

Generating Maps of an Environment

In accordance with the disclosed principles, the HMD cameras and/or the external cameras (whether mounted on a tool, gaming weapon, a standalone camera, and so forth) can be used to generate a map (e.g., a two-dimensional (2D) map and/or a three-dimensional (3D) map) of the environment in which the camera is physically located. Although a majority of this disclosure will focus on the HMD's cameras, it should be noted that the disclosed principles are equally applicable when the external camera is being used. As such, the principles should be interpreted broadly and should not be constrained solely to situations involving only a HMD.

It should also be noted how the disclosed principles are primarily practiced in environments that are global positioning system (GPS) denied and that have not been previously mapped. Further details on these aspects will be provided later. In any event, it is typically the case that previous maps have not been generated for the disclosed environments or at least are not accessible by the disclosed HMDs.

Figure 7:
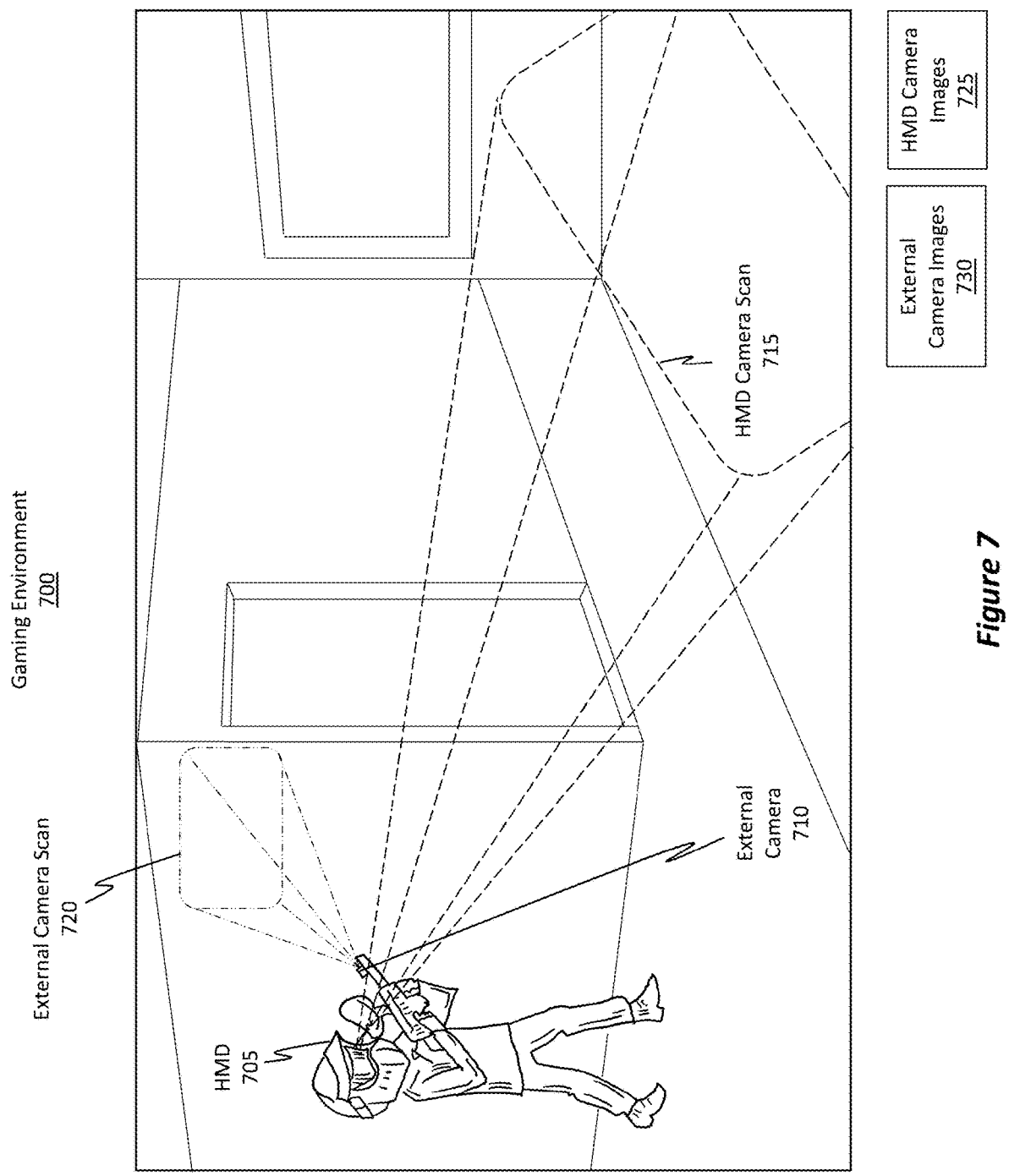
FIG. 7 illustrates how the HMD cameras can scan an environment.
Figure 8:
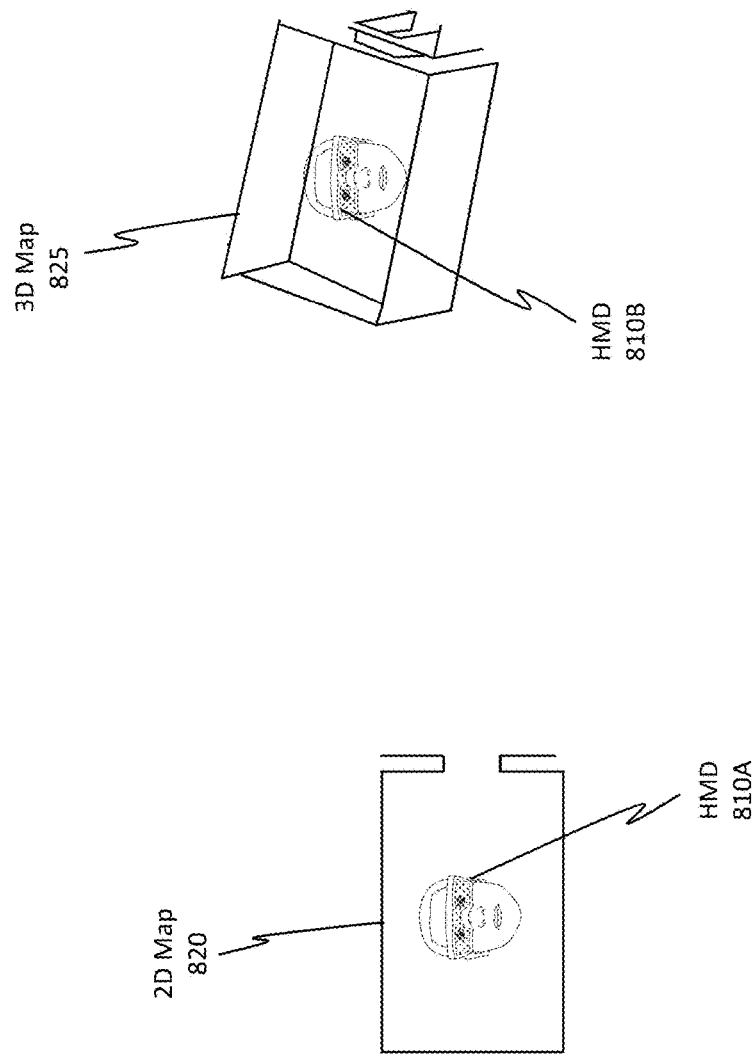
FIG. 8 illustrates how a map of the environment can be progressively built up based on the HMD's images.
Figure 9:
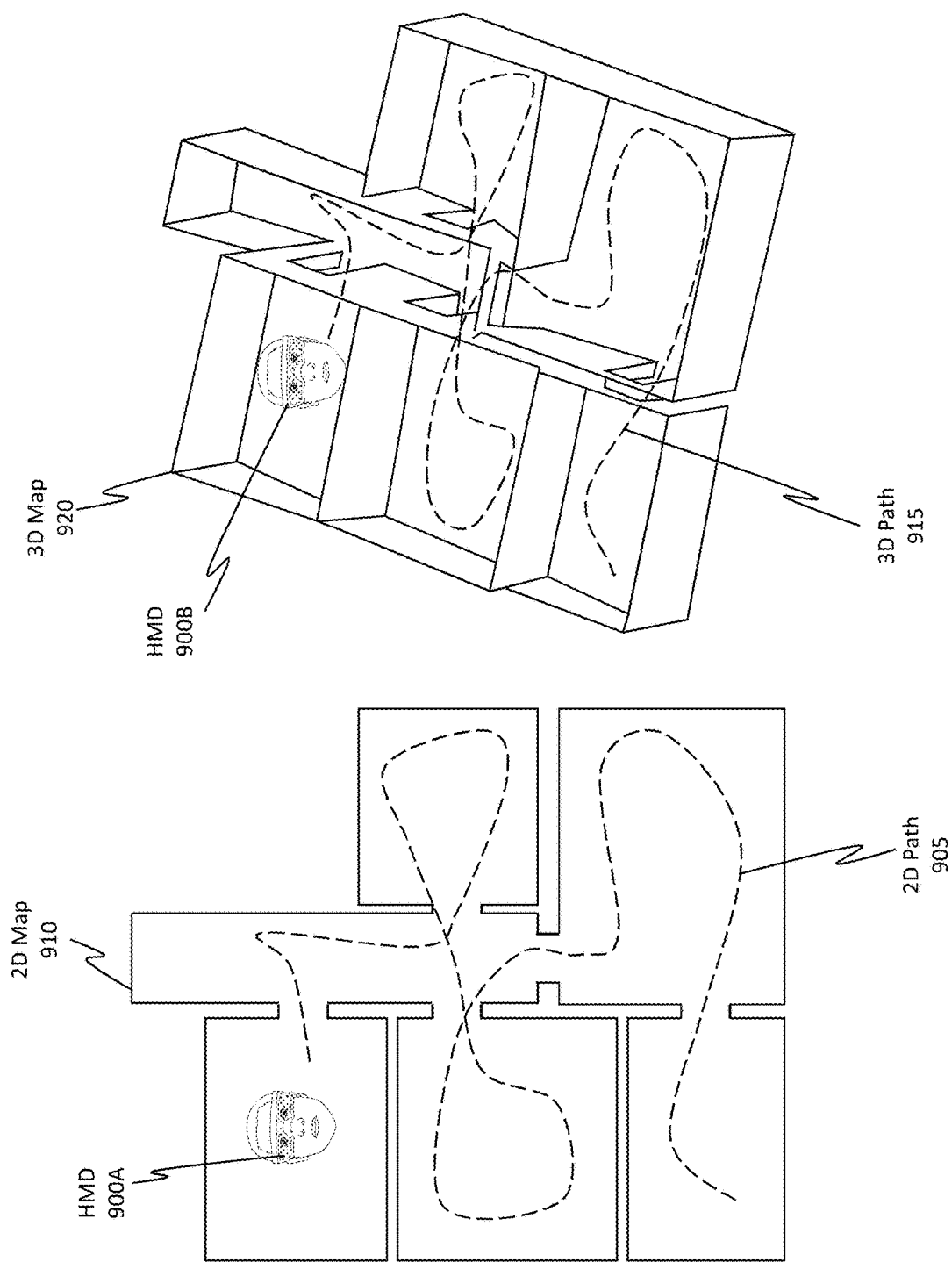
FIG. 9 illustrates another view of how maps can be progressively generated.
Figure 10:
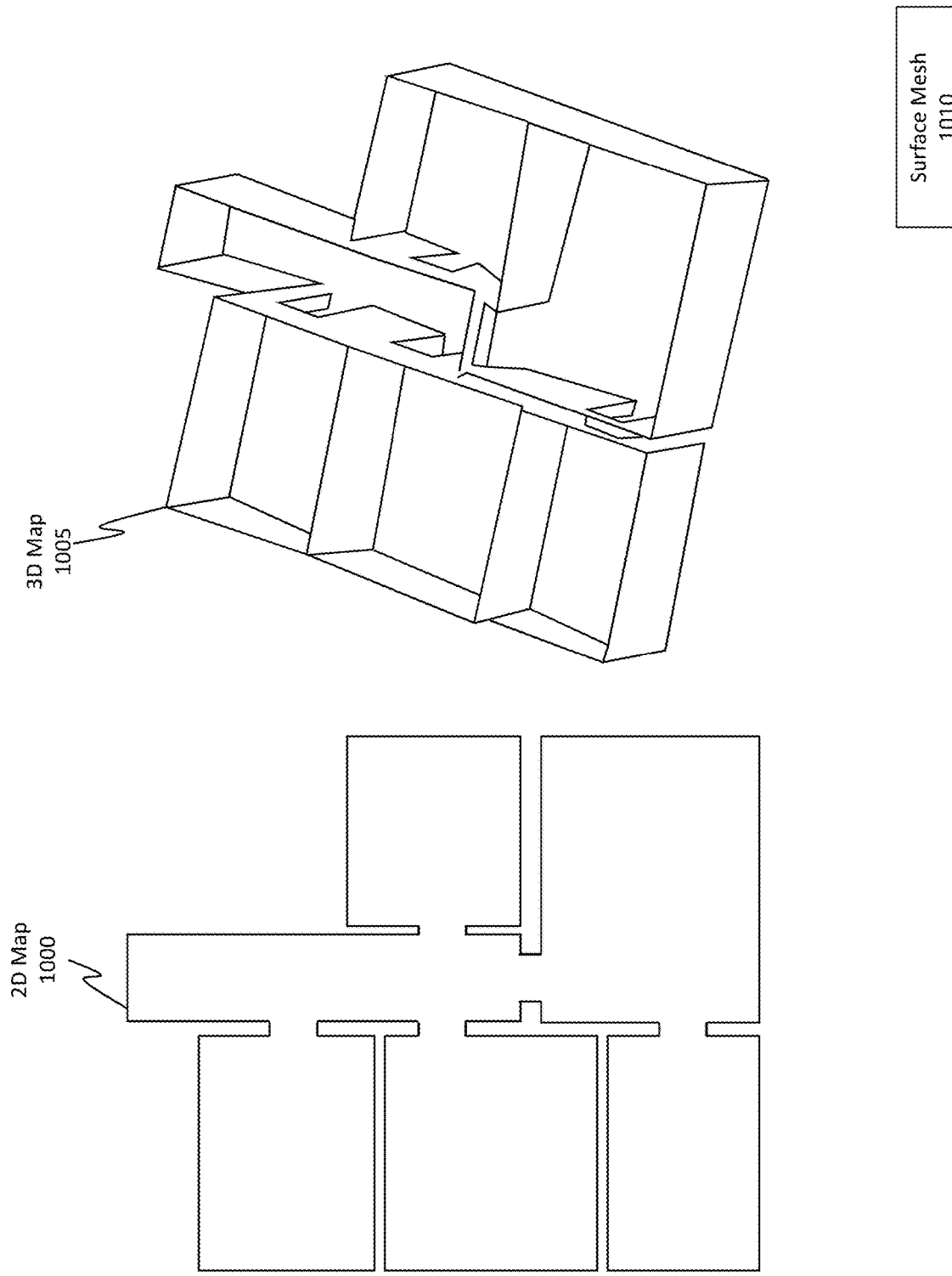
FIG. 10 illustrates a completed map.

FIG. 7 shows a gaming environment 700 involving the use of a HMD 705 and an external camera 710. Here, the HMD 705 is using its cameras to scan the gaming environment 700, as shown by HMD camera scan 715. Similarly, the external camera 710 is using its sensors to scan the gaming environment 700 as well, as shown by external camera scan 720. By "scan" it is meant that the cameras are generating images of the environment so those images can be used to generate a map (e.g., a 2D map and/or a 3D map) of the environment. Specifically, the HMD 705 is generating HMD camera images 725, and the external camera 710 is generating external camera images 730. As more images are acquired over time, the embodiments are able to progressively build up a map of the HMD's environment. FIGS. 8, 9, and 10 are illustrative.

FIG. 8 shows a previously unmapped environment 800, which is also a GPS denied environment 805. By "previously unmapped environment," it is meant that either the environment has not been previously mapped by a HMD or, alternatively, the environment has been previously mapped but that mapping is not accessible. Therefore, even if the environment has been previously mapped, the HMD is unable to access the mapping. By "GPS denied," it is meant that the signal strength of a GPS signal is below a threshold level such that GPS data is not sufficiently reliable for use by the HMD. GPS denied environments include any type of indoor environment where GPS signals are not able to sufficiently permeate through the building structure's walls.

FIG. 8 also shows a HMD 810A, which is representative of the HMDs discussed thus far. HMD 810A scans the previously unmapped environment 800 and generates raw images 815 of that environment. Using these raw images 815, a two-dimensional (2D) map 820 can be generated. Similarly, FIG. 8 shows a HMD 810B, which is representative of the HMD 810A, and also shows a 3D map 825. The 2D map 820 effectively portrays the environment from a bird's eye perspective. The 3D map 825 portrays the environment in a three-dimensional manner. As will be discussed in more detail later, the 3D map 825 is distinct from a surface reconstruction mesh of the environment.

As the HMD is transported throughout the different areas of the environment and as more images of the environment are generated, the map of the environment can be progressively built over time.

FIG. 9 shows a HMD 900A that is being moved throughout the environment mentioned in FIG. 8. The 2D path 905 illustrates the HMD 900A's progression through the different rooms or areas of that environment. As the HMD 900A is moved, the HMD 900A scans the environment and generates images. Those images are used to then build or generate a map of the environment, as shown by the 2D map 910. Similarly, FIG. 9 shows the HMD 900B (which is representative of HMD 900A), the 3D path 915 (i.e. the path representing the 3D movement of the HMD 900B), and the resulting 3D map 920 (i.e. a 3D map version of the 2D map 910).

FIG. 10 shows the resulting 2D map 1000 and the resulting 3D map 1005, which are both based on the same environment and which were both generated using the images provided by the HMD. It should be noted that generating a map of the environment (e.g., 2D map 1000 or 3D map 1005) is independent from generating a surface mesh 1010 (aka surface reconstruction mesh). The surface mesh 1010 is a 3D representation of an object or an environment using 3D triangle imagery. Maps, on the other hand, include sparse 3D points that are not necessarily connected to one other but that are used by the HMD to provide internal location awareness. If a sufficient number of raw images is generated and if those images include a sufficient amount of texture, then the surface mesh 1010 can be generated from those images in addition to any maps. Accordingly, the embodiments are able to use raw images in order to generate maps of an environment. Further details on how this generation occurs will be provided later.

Figure 11:
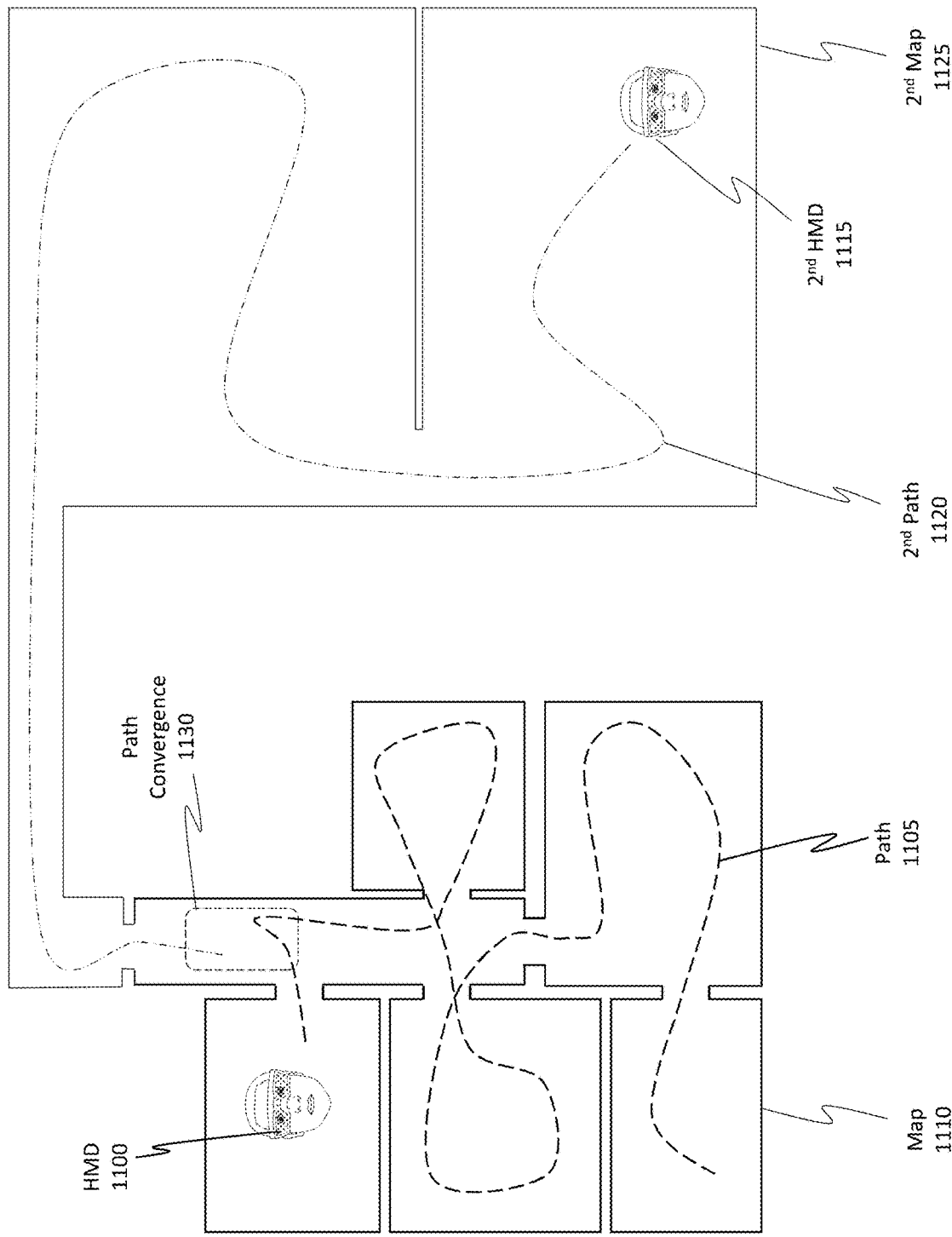
FIG. 11 illustrates how different maps can be linked together when those maps converge at a common location.

When multiple HMDs are present in an environment, then the maps generated from images produced by those HMDs can be combined together when there is a convergence point capable of linking those maps. FIG. 11 is illustrative.

FIG. 11 shows a HMD 1100 that has generated images while the HMD 1100 traverses a path 1105. Those images are then used to generate the map 1110 as discussed previously. In this scenario, however, the environment is larger than what is illustrated by the map 1110. For example, FIG. 11 shows a $2^{nd}$ HMD 1115 that is generated images while traversing a $2^{nd}$ path 1120. Using those images, the embodiments are able to generate the $2^{nd}$ map 1125.

FIG. 11 also shows a path convergence 1130, which is a location where images generated by the HMD 1100 reflect the same content as images generated by the $2^{nd}$ HMD 1115. Notably, the two paths (path 1105 and $2^{nd}$ path 1120) need not actually intersect (though they may) as shown by FIG. 11 where the paths do not actually cross one another. Instead, the paths are sufficiently near one another that the images generated by the different HMDs capture the same environmental area or content.

Figure 12:
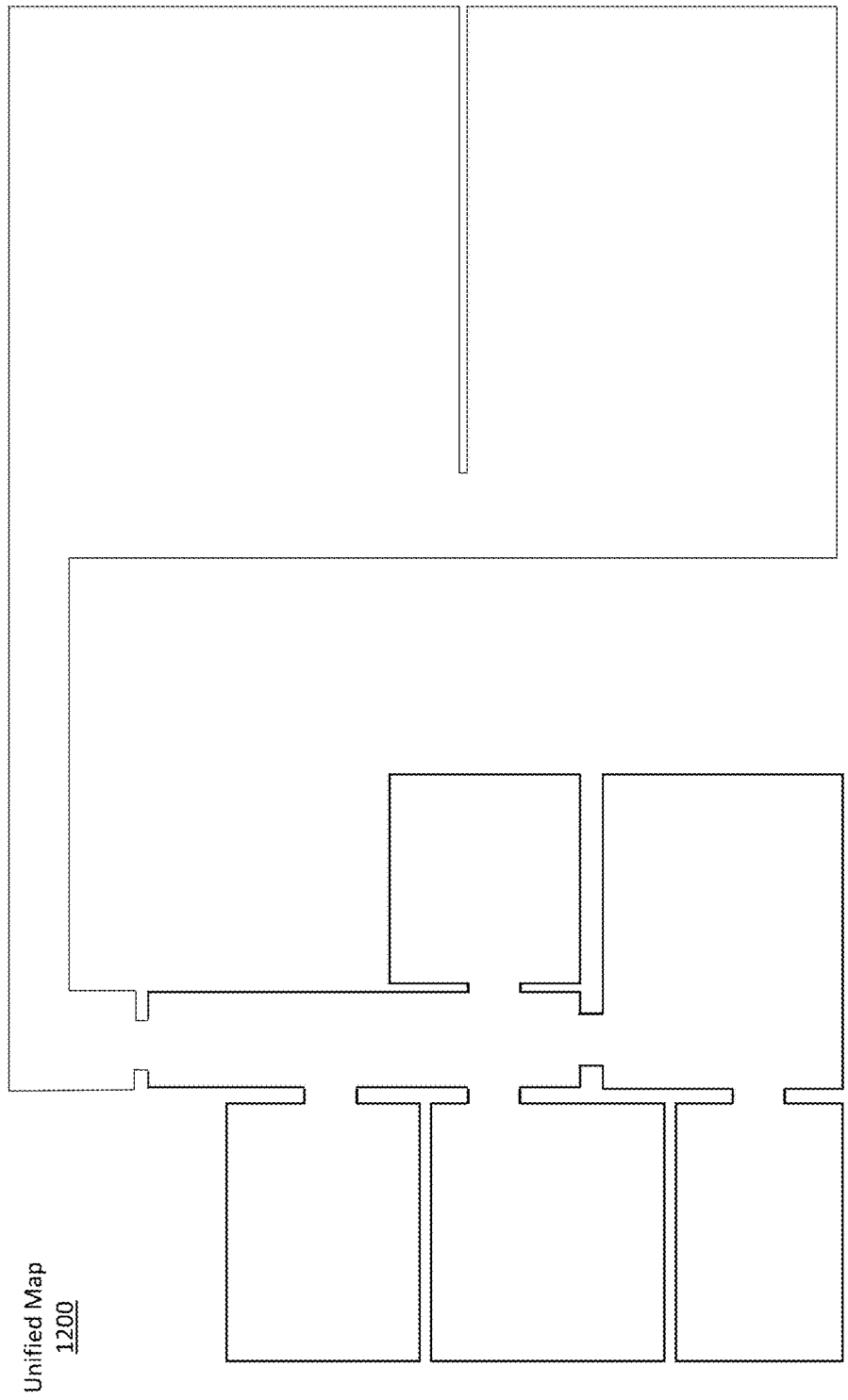
FIG. 12 illustrates a completed unified map.

By way of example, at one point in time, the HMD 1100 was in the hallway area represented by the path convergence 1130. At some point in time (either before, during, or even after the point of time for the HMD 1100), the $2^{nd}$ HMD 1115 was also in the hallway area represented by the path convergence 1130. By way of additional clarification, the timing as to when the path convergence 1130 occurs can be any time. That is, it is not a requirement that the HMD 1100 and the $2^{nd}$ HMD 1115 arrive at the path convergence 1130 at the same time; instead, the two HMDs can arrive at the path convergence 1130 at any point in time. Once that convergence occurs, however, then the two maps 1110 and 1125 can be joined, merged, linked, or fused together to form a unified map. As the paths of the two HMDs continue to expand, the unified map will also expand. FIG. 12 shows a unified map 1200 which is the union of the map 1110 and the $2^{nd}$ map 1125 of FIG. 11. It should be noted that while these figures have been illustrating a 2D map, one will appreciate that a 3D map may also be generated.

Prior to a path convergence being formed, each HMD effectively generates its own respective mapping of the environment. Once the path convergence is formed, then the respective maps can be linked together, thereby forming the unified map 1200. As far as identifying the path convergence, in some cases (perhaps at different points in time or perhaps at the same point in time), the different HMDs might occupy the same space. Optionally, the HMDs may be distant from one another but their respective cameras are able to capture images of the same landmark or environmental feature. An example will be helpful.

Suppose at time T0, a first HMD is some distance away from a landmark or environment feature. This distance can be 0.1 meters, 1.0 m, 2 m, 3 m, 4 m, 5 m, 6 m, 7 m, 8 m, 9 m, 10 m, or more than 10 meters away from the landmark. In any event, however, the first HMD generates an image of the landmark, and that image is used to generate a map of the environment.

Suppose at time T1, a second HMD arrives in the same environment as the first HMD was previously in or is currently in. The second HMD is some distance away from the landmark or environment feature. Again, this distance can be any distance, as recited above. Here, too, the second HMD generates an image of the landmark, and that image is used to generate a map of the environment.

Now, because both HMDs have captured images of the same landmark, a path convergence has been formed, and the two different maps can be linked to one another to form a unified map. From the above discussion, one will appreciate how the HMDs need not be located closely to a landmark in order for that landmark to serve as a path convergence. Instead, as long as the view of the landmark is sufficiently clear in the resulting images, then the landmark can still serve as a path convergence. Furthermore, time T0 and T1 may be the same time or they may be different times.

As used herein, a "landmark" simply refers to a uniquely identifiable object that can be recognized in different images generated by different HMDs. Any object or thing can serve as a "landmark." Examples of landmarks include, but certainly are not limited to, corners of a wall or door, a picture hung on a wall, a window frame, a couch, a desk, a chair, and so on without limit.

Figure 13:
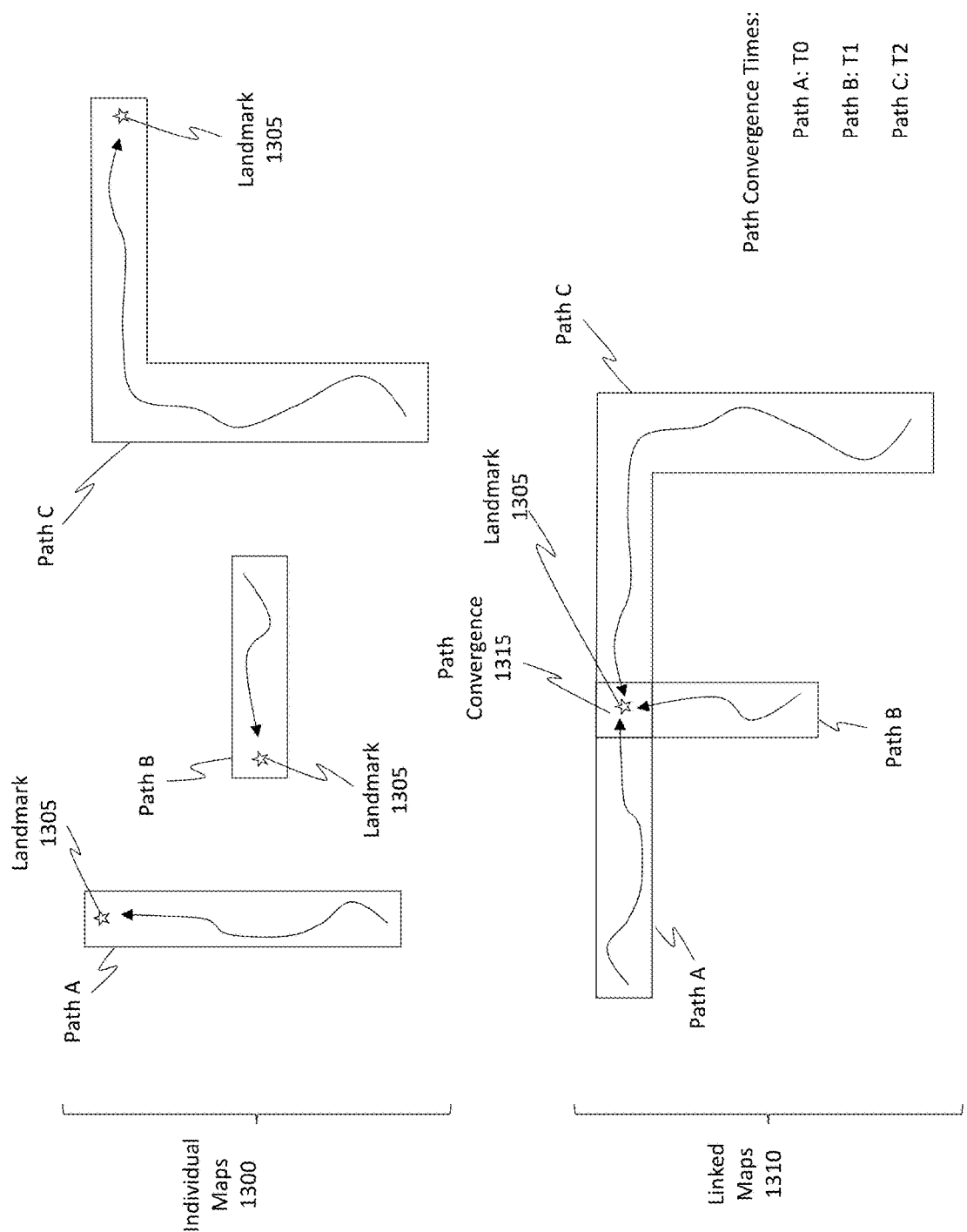
FIG. 13 illustrates how different maps are linked based on convergences.

FIG. 13 illustrates a number of individual maps 1300, which are paths and corresponding maps traversed by different HMDs. In this example scenario, there are three different HMDs traversing three different paths and thereby generating three different maps. For example, a first HMD is traversing Path A (and thus generating map A), a second HMD is traversing Path B (and thus generating map B), and a third HMD is traversing Path C (and thus generating map C). Each of these HMDs navigate different paths, but they eventually all capture images of the same landmark 1305. FIG. 13 shows that the HMD traversing Path A reaches the landmark 1305 at time T0; the HMD traversing Path B reaches the landmark 1305 at time T1; and the HMD traversing Path C reaches the landmark 1305 at time T2. These times may all be different or they may be the same or two or more of them may be the same or different.

Because the different paths all converged at the landmark 1305, the different maps can all be linked together, as shown by the linked maps 1310, where the different individual maps are linked at the path convergence 1315, which linkage occurs because the different HMDs all captured images of the same landmark 1305. Now, a unified map can be generated by linking together all of the individual maps.

Determining Pose Evolution

In addition to generating a map of an environment (including a unified map formed by linking together multiple maps having a convergence point or a path convergence), the embodiments are also able to determine an HMD's pose evolution. As used herein, the phrase "pose evolution" refers to the ability to determine and track the pose of an HMD over time or even the pose of an external camera over time. A pose evolution records the different poses of a HMD over a determined period of time. Those poses are accessible for later review.

Figure 14:
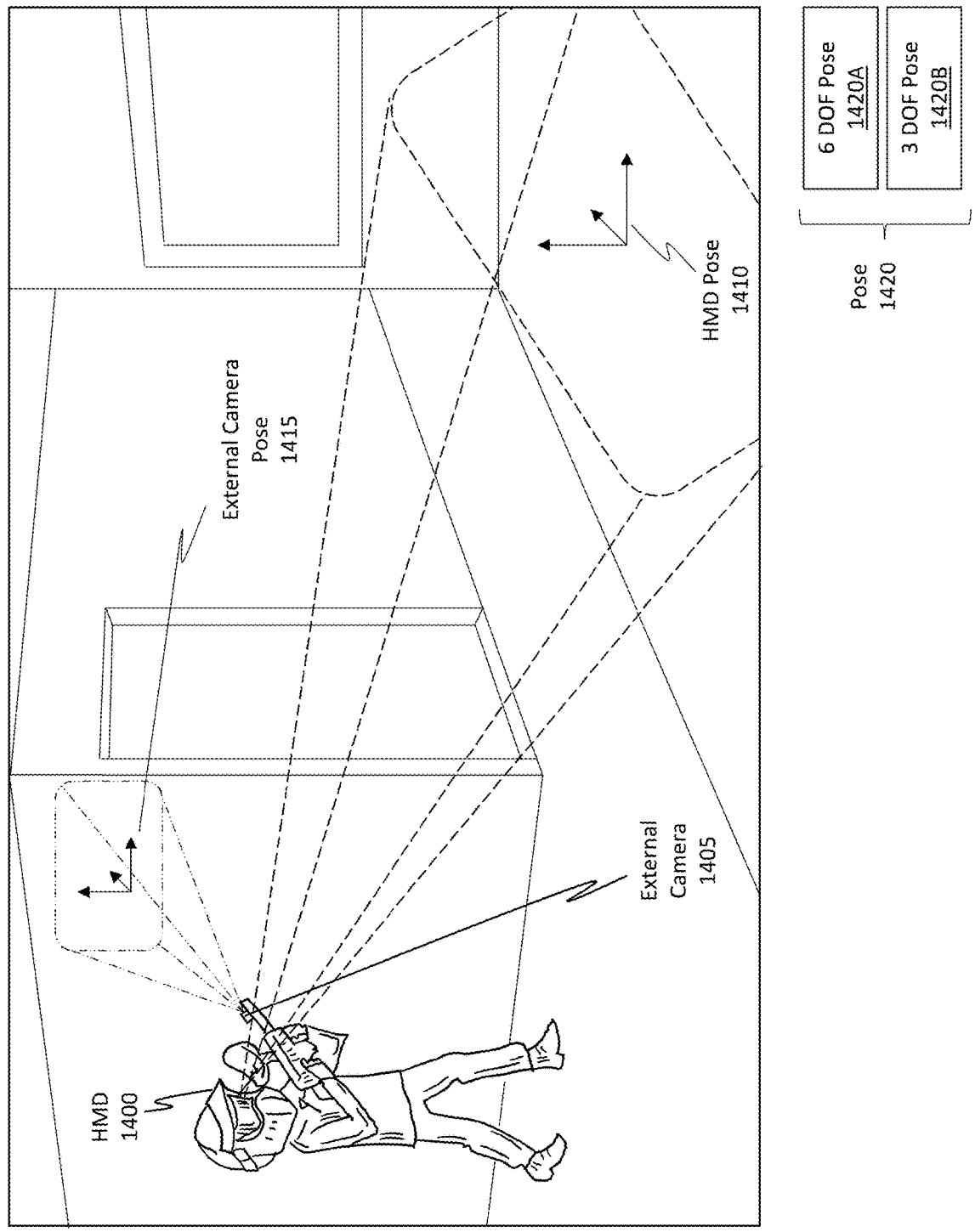
FIG. 14 illustrates how a pose of the HMD can be determined.

FIG. 14 shows a HMD 1400 and an external camera 1405. In accordance with the disclosed principles, the embodiments are able to determine a HMD pose 1410 of the HMD 1400 and, optionally, an external camera pose 1415 of the external camera 1405. The HMD pose 1410 and the external camera pose 1415 can generally be referred to as a pose 1420, which includes a 6 degree of freedom (DOF) pose 1420A and/or a 3 DOF pose 1420B.

Generally, the 6 DOF pose 1420A refers to the movement or position of an object in three-dimensional space. The 6 DOF pose 1420A includes surge (i.e. forward and backward in the x-axis direction), heave (i.e. up and down in the z-axis direction), and sway (i.e. left and right in the y-axis direction). In this regard, 6 DOF pose 1420A refers to the combination of 3 translations and 3 rotations. Any possible movement of a body can be expressed using the 6 DOF pose.

Generally, the 3 DOF pose 1420B refers to tracking rotational motion only, such as pitch (i.e. the transverse axis), yaw (i.e. the normal axis), and roll (i.e. the longitudinal axis). The 3 DOF pose 1420B allows the HMD to track rotational motion but not translational movement of itself and of the HMD camera. As a further explanation, the 3 DOF pose 1420B allows the HMD to determine whether a user (who is wearing the HMD) is looking left or right, whether the user is rotating his/her head up or down, or whether the user is pivoting left or right. In contrast to the 6 DOF pose 1420A, when 3 DOF pose 1420B is used, the HMD is not able to determine whether the user (or system camera) has moved in a translational manner, such as by moving to a new location in the environment.

Determining the 6 DOF pose 1420A and the 3 DOF pose 1420B can be performed using inbuilt sensors, such as accelerometers, gyroscopes, and magnetometers (collectively, an inertial measurement unit "IMU"). Determining the 6 DOF pose 1420A and the 3 DOF pose 1420B can also be performed using positional tracking sensors, such as head tracking sensors. The pose 1420 may also be computed for the external camera 1405 using an IMU of the external camera 1405 and/or images generated by the external camera 1405.

Figure 15:
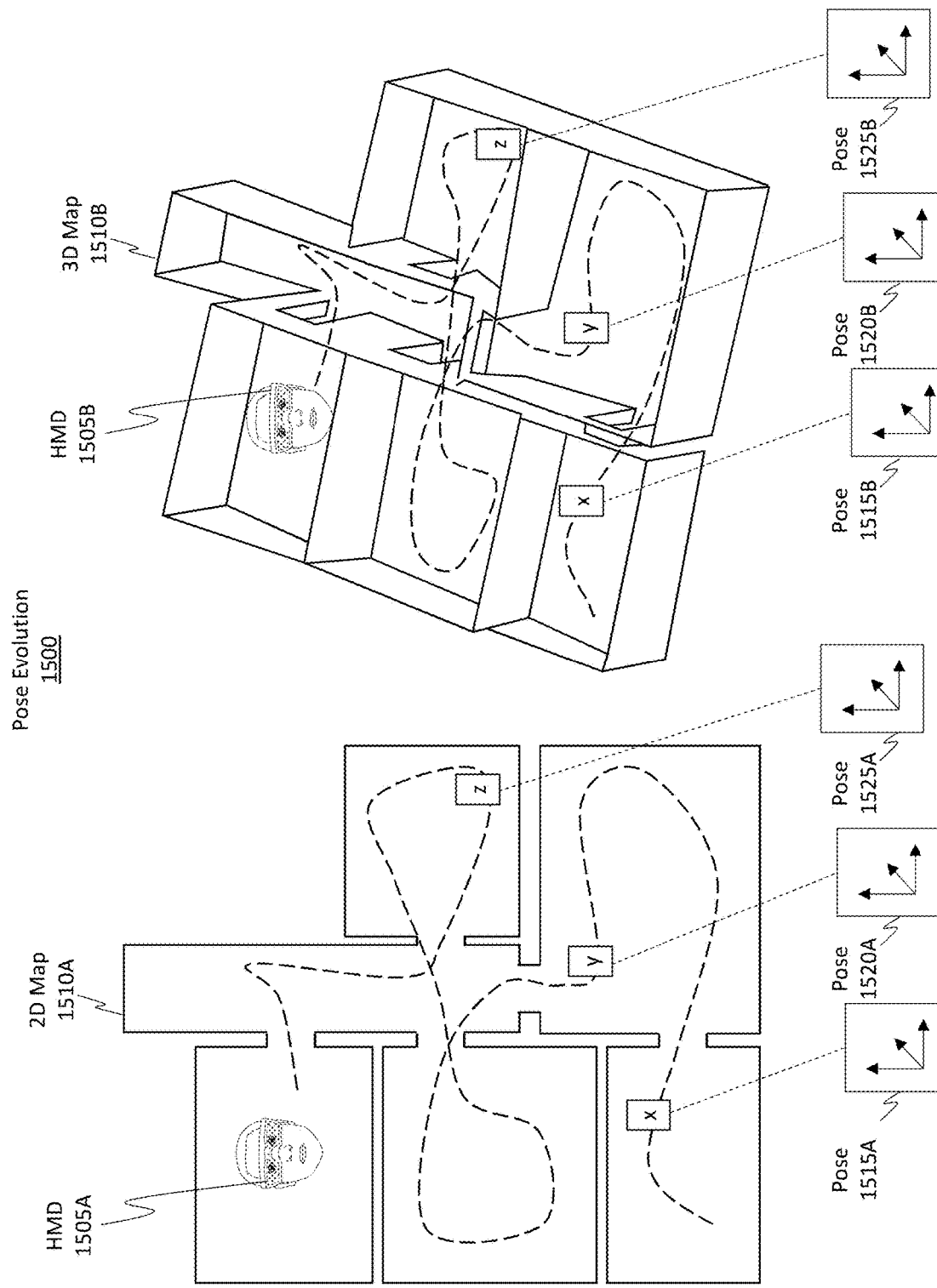
FIG. 15 illustrates a pose evolution of the HMD, where the pose evolution records poses of the HMD throughout a determined time period.

Notably, the pose of the HMD (or external camera) is likely to change almost constantly throughout time, meaning that it is rare for the HMD to remain in the same exact position for a prolonged period of time while in use. Tracking or determining the poses of the HMD over time is referred to as the HMD's pose evolution. FIG. 15 is illustrative.

FIG. 15 shows a pose evolution 1500 of a HMD 1505A. As discussed, the HMD 1505A has generated images of an environment, where those images are used to generate a map of that environment, as shown by the 2D map 1510A. While those images are generated and simultaneously with while the 2D map 1510A is being generated, the embodiments also use the images to determine the poses of the HMD 1505A throughout different instances of time, or throughout different timestamps across a time period. FIG. 15 shows a few examples of the computed poses of the HMD 1505A as the HMD 1505A traverses a path through the environment.

To illustrate, FIG. 15 shows a pose 1515A, a pose 1520A, and a pose 1525A. While only three poses are illustrated, one will appreciate how an almost unlimited number of poses may be determined. For example, a pose of the HMD 1505A may be determined every 1 millisecond, 2 ms, 3 ms, 4 ms, 5 ms, 6 ms, 7 ms, 8 ms, 9 ms, 10 ms, 100 ms, 200 ms, 300 ms, 400 ms, 500 ms, 600 ms, 700 ms, 800 ms, 900 ms, 1 second, 2 seconds, 3 seconds, 4 seconds, 5 seconds, or more than 5 seconds, or any other frequency or time period.

These poses are recorded and are linked to the location where the HMD 1505A was located when the pose was determined. Furthermore, these poses are accessible at any time, such as during an after action review of the user's performance. As an example, suppose a first responder is engaging in a training exercise. The HMD worn by the first responder is able to generate images, and those images can be used to not only map out the environment but also to determine the HMD's pose evolution during the training exercise. Later, when an after action review is performed to review the first responder's performance, the pose evolution can be accessed and the poses of the HMD can be reviewed at any point in time.

Optionally, the path traversed by the HMD can be displayed along with the generated map. A reviewer can select any point on the displayed path, and the corresponding pose of the HMD at the selected point in time and selected location can be displayed for the reviewer to see. For example, by selecting the point labeled "x" (which point is associated with a specific location of the HMD 1505A at a particular timestamp during the HMD 1505A's travels), the pose 1515A may be displayed, where the pose 1515A reflects the orientation or trajectory of the HMD 1505A at the selected location and point in time. Similarly, selecting the point labeled "y" will cause the pose 1520A to be displayed; and selecting the point labeled "z" will cause the pose 1525A to be displayed.

The pose evolution may also be played back in video form, such as by using stop, play, fast forward, and reverse options. That is, the pose evolution can be compiled in video form and a reviewer can view the poses over time. In some cases, the video may include actual imagery from the HMD. In some cases, the video may include the map (2D or 3D map), an indication of the path traveled by the HMD, and even a sweep of the HMD's pose relative to the map. A "sweep" will be discussed in more detail with regard to FIG. 19 (e.g., the visual illustration provided by pose 1910 is considered a "sweep").

FIG. 15 also shows the 3D representation, as shown by the HMD 1505B (which is representative of the HMD 1505A) and the 3D map 1510B. Three points ("x," "y," and "z") are also displayed and correspond to the previous "x," "y," and "z" points mentioned earlier. When point "x" is selected in the 3D map 1510B, the pose 1515B is displayed; when point "y" is selected, the pose 1520B is displayed; and when point "z" is selected, the pose 1525B is displayed. Again, the pose evolution may be displayed in video form relative to the 3D map 1510B by displaying pose sweeps and paths.

It should be noted how numerous different pieces of information may be displayed in order to show the pose of the HMD. In some cases, the actual image of the HMD at the selected point in time is displayed. In some cases, the pose is displayed from an aerial perspective (or a top looking down perspective) and the FOV of the HMD is illustrated is illustrated in the form of a "sweep." In some cases, angular information reflecting the angle of the HMD relative to a gravity vector may be displayed. Any other data may also be displayed to reflect the HMD's pose at the selected point in time.

Figure 16:
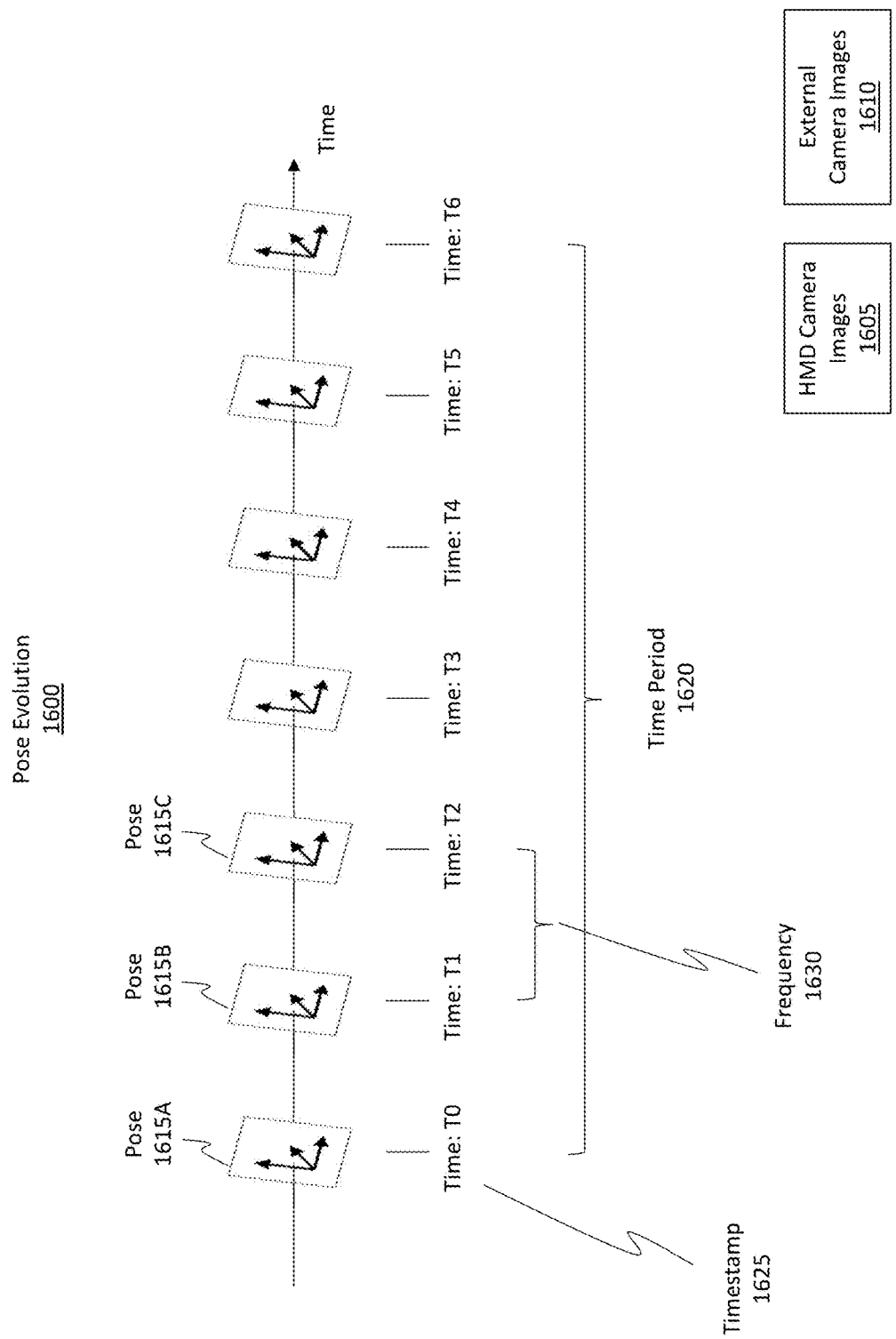
FIG. 16 illustrates a timeline showing different poses included in a pose evolution.

FIG. 16 shows a pose evolution 1600, which is generated based on HMD camera images 1605 and/or external camera images 1610. The pose evolution 1600 includes a compilation of different poses, one of which is labeled as pose 1615A. The poses are computed over time. For example, pose 1615A is computed at time T0; pose 1615B is computed at time T1; pose 1615C is computed at time T2; and so on throughout a determined time period 1620. The time period 1620 may be the operational time while the HMD is engaged in a particular activity, such as perhaps a gaming activity, a training activity, and so forth. During the time period 1620, the HMD generates the HMD camera images 1605, and those images are used to simultaneously generate the map and the pose evolution of the HMD. As more images are generated, additional content can be added to the map and additional poses can be added to the pose evolution 1600.

Each pose is associated with its own corresponding timestamp. For example, pose 1615A is associated with timestamp 1625 and the other poses are associated with their own respective timestamps. The frequency 1630 by which the poses are computed is adjustable. In some instances, the frequency 1630 is constant (such as every 1 ms, 5 ms, 10 ms, 20 ms, and so forth, as described earlier) while in other instances the frequency 1630 is dynamically adjustable. Optionally, adjusting the frequency 1630 may be based on events that are detected within the environment. An example will be helpful.

Suppose the HMD is being used in the paintball scenario mentioned earlier. Often, there are periods of time where no engagement between the players occurs. During such "slow" time periods, the HMD may dynamically adjust the frequency 1630 to generate poses less periodically. When the HMD detects the presence or proximity of other players, thereby leading to a "fast" time period in which engagement is occurring or will likely occur, then the HMD can dynamically alter or change the frequency 1630 to generate poses more rapidly, or at an increased rate. In some cases, the frequency 1630 may be 10 Hz, 20 Hz, 30 Hz, 40 Hz, 50 Hz, 60 Hz, 70 Hz, 80 Hz, 90 Hz, 100 Hz, 110 Hz, 120 Hz, or even faster than 120 Hz. Accordingly, a pose evolution refers to a compilation of poses of an HMD over time.

Figure 17:
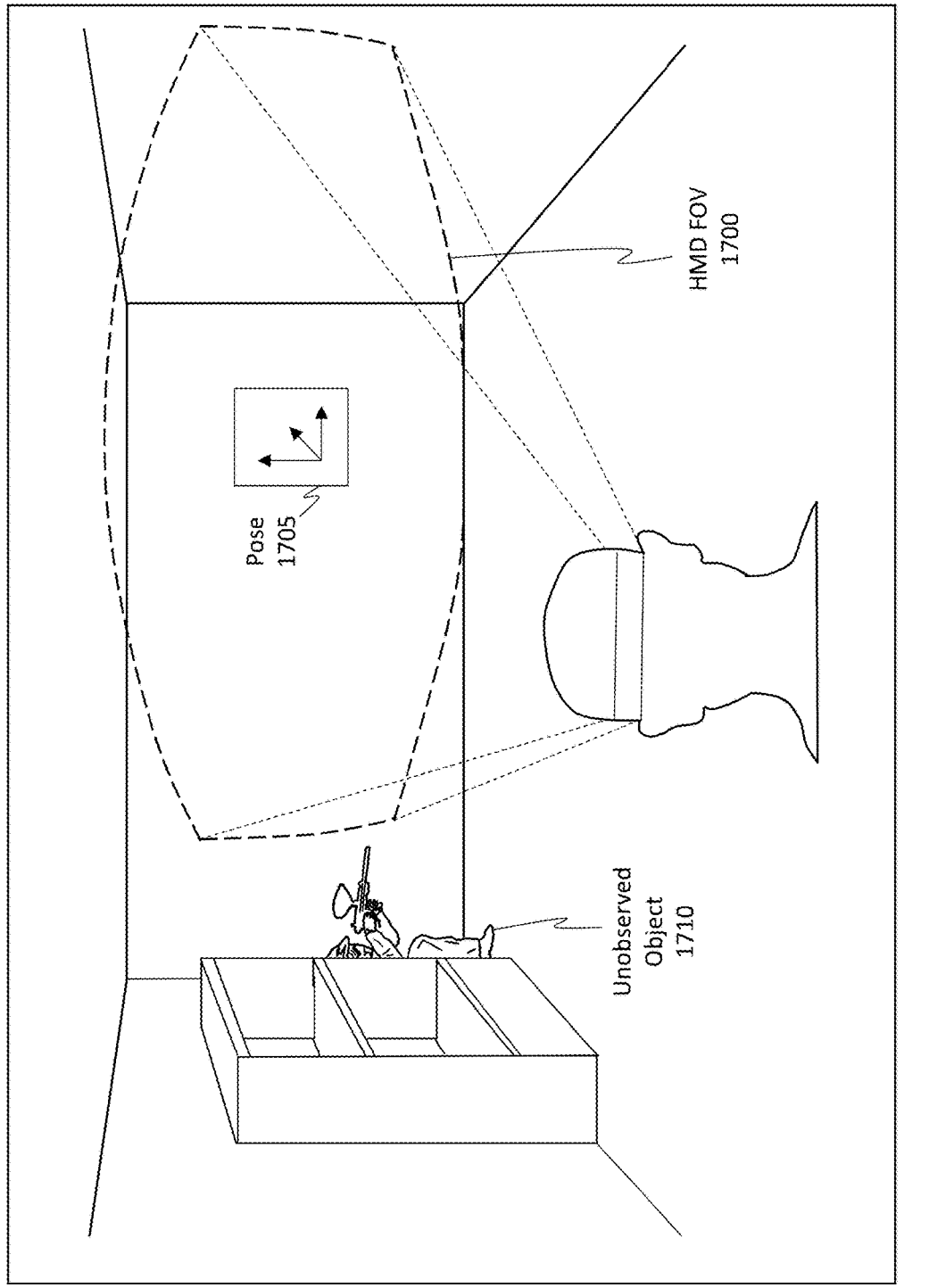
FIG. 17 illustrates one example view that may be provided when displaying pose information.

FIG. 17 shows how, when pose information is displayed, the HMD's actual FOV can be displayed. For example, when a particular pose is selected in the pose evolution, the HMD FOV 1700 can be displayed, along with supplemental pose 1705 information, such as directional arrows, coordinates, and so forth. In this example case, the user wearing the HMD is engaged in a gaming scenario, and the user has not yet detected or observed the unobserved object 1710, which is another player in the game. To be clear, the unobserved object 1710 is not included within the HMD FOV 1700 and thus is considered to be "unobserved." Here, this particular pose is at time T0.

Figure 18:
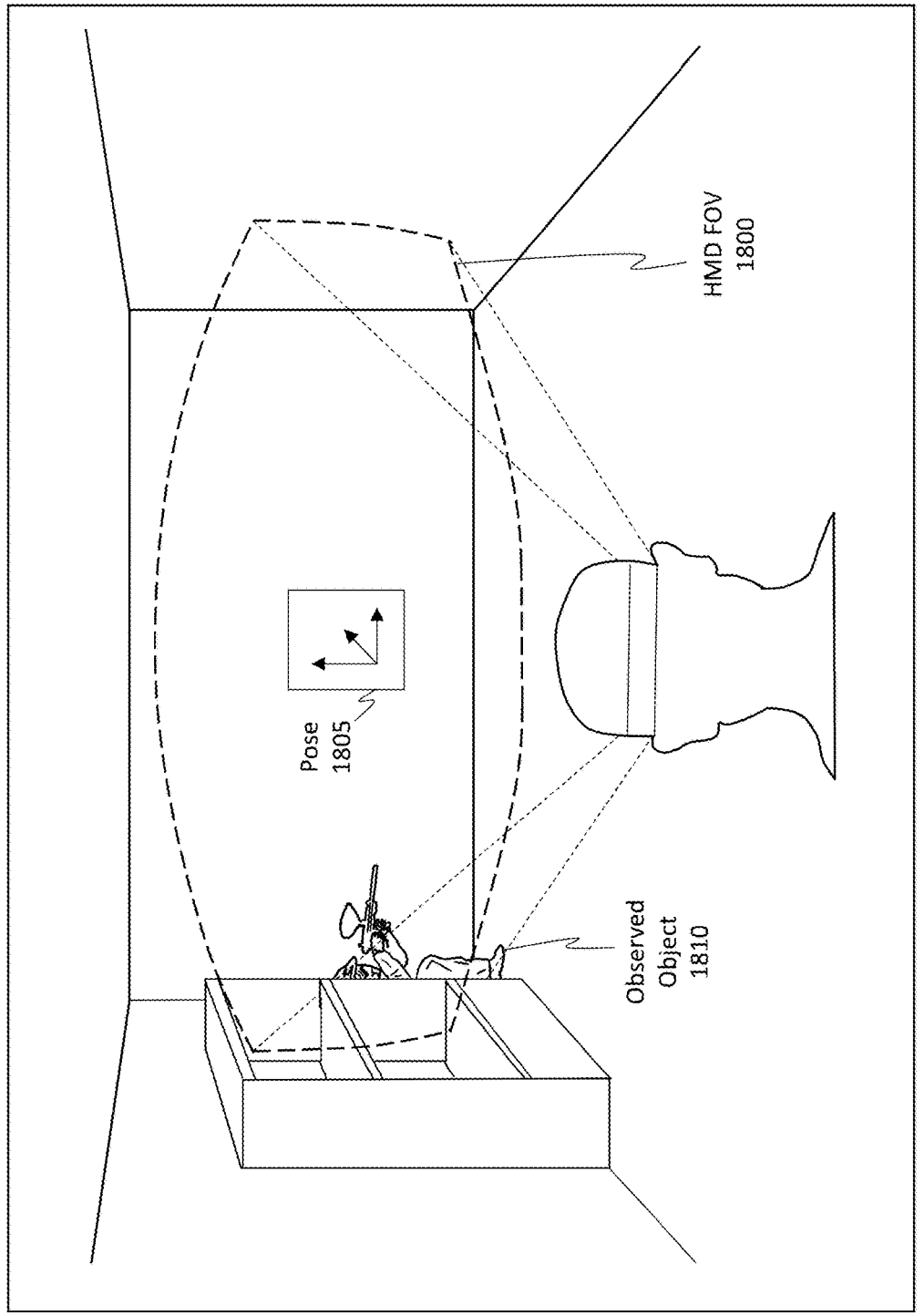
FIG. 18 illustrates another example view that may be provided when displaying pose information.

FIG. 18 shows a different pose, now at time T1. Again, the HMD FOV 1800 may be displayed, along with supplemental pose 1805 information. At this point in time, the pose has shifted so that now the previously unobserved object is now observed (because it is included within the HMD FOV 1800), as shown by the observed object 1810. By providing the pose information, after action reviews are greatly improved and benefited because now reviewers can view the exact pose of a user's HMD at any point in time. Doing so helps reviewers determine a user's reaction time, situational awareness, ability to adapt to new circumstances, and training effectiveness.

Figure 19:
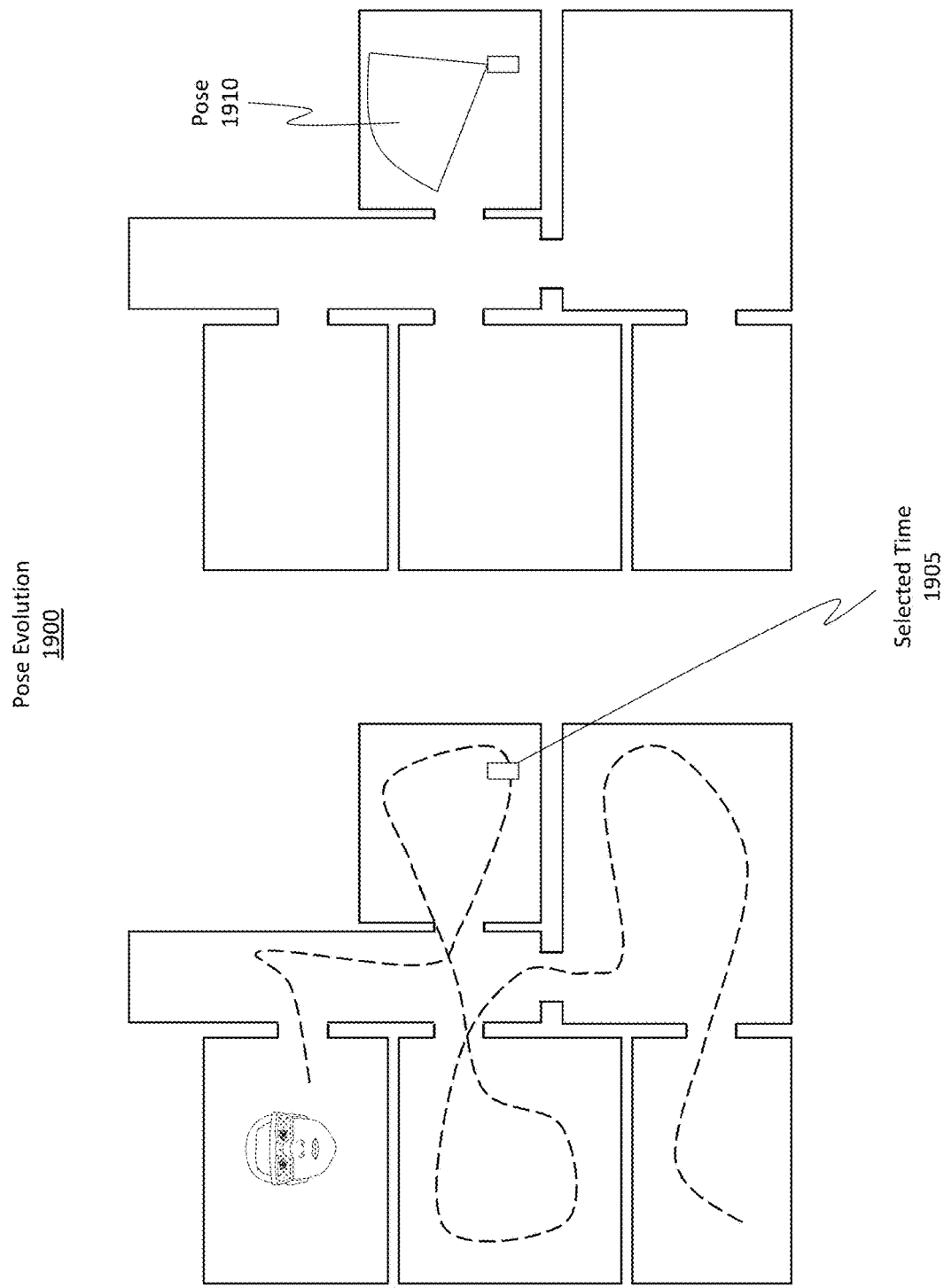
FIG. 19 shows how pose data can be overlaid on top of map data.

FIG. 19 shows another illustration of a pose evolution 1900. Here, a reviewer during an after action review has selected a particular location within the resulting map, as shown by selected time 1905. In response to that selection, the embodiments are able to display the pose 1910 of the user's HMD in the resulting map in the form of a "sweep" in which the FOV of the HMD is displayed relative to the map. For example, the pose 1910 shows the 2D orientation or direction in which the HMD is facing. This 2D illustration is again from a bird's eye view in the form of a sweep. Additionally, or alternatively, the embodiments can display the HMD's actual imagery and/or other pose information. When the pose evolution is displayed in a video mode, then the reviewer will be able to see the sweep move based on the HMD's movements and poses.

Figure 20:
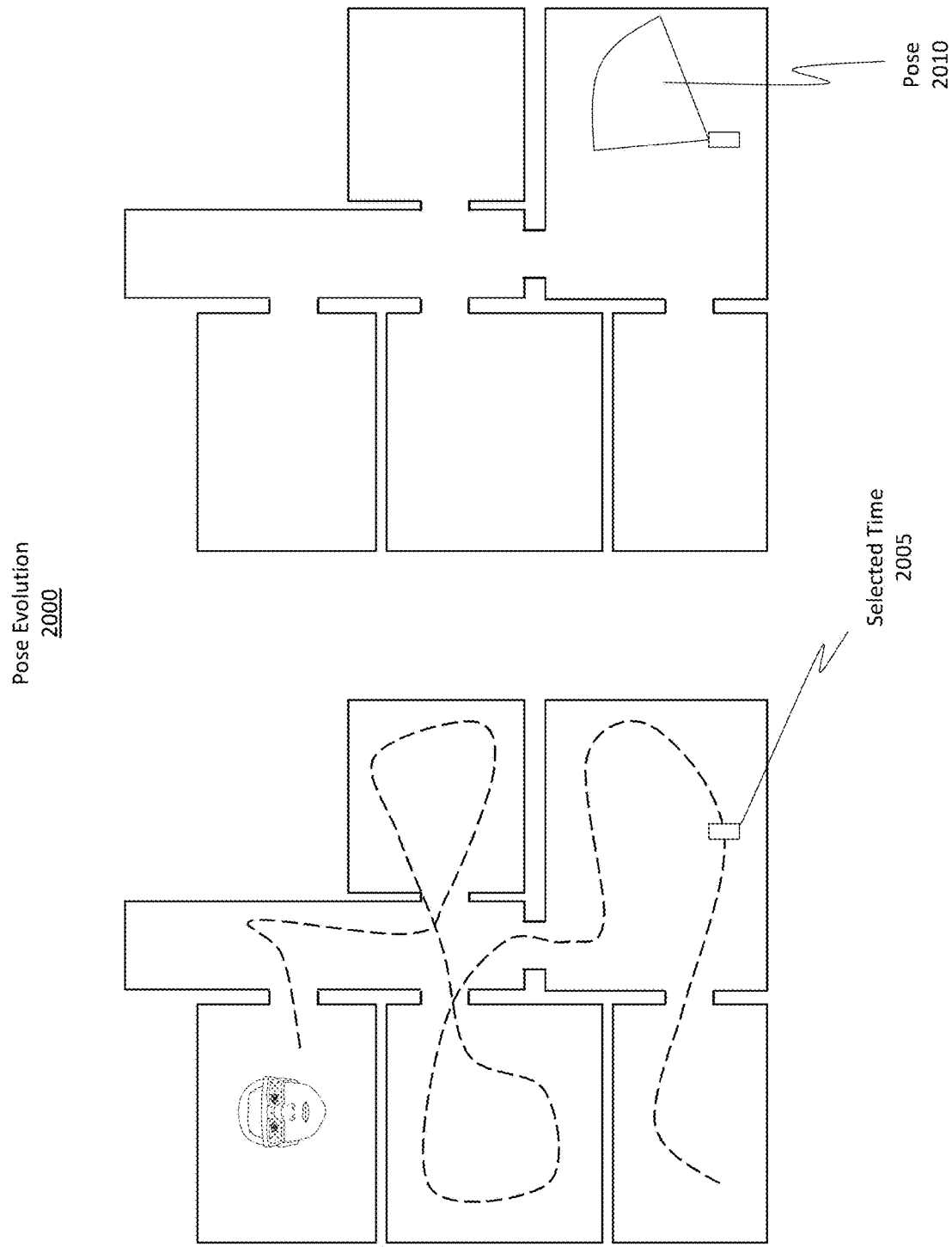
FIG. 20 shows another view of pose data overlaid on top of map data.

FIG. 20 shows a related pose evolution 2000, where the reviewer has selected a point along the HMD's traveled path, which may be displayed and which is selectable. Here, the reviewer has selected the selected time 2005. The corresponding pose 2010 for that selected time 2005 may be displayed in the form of a sweep. Here, the pose 2010 shows the orientation of the HMD at the selected time 2005.

Figure 21:
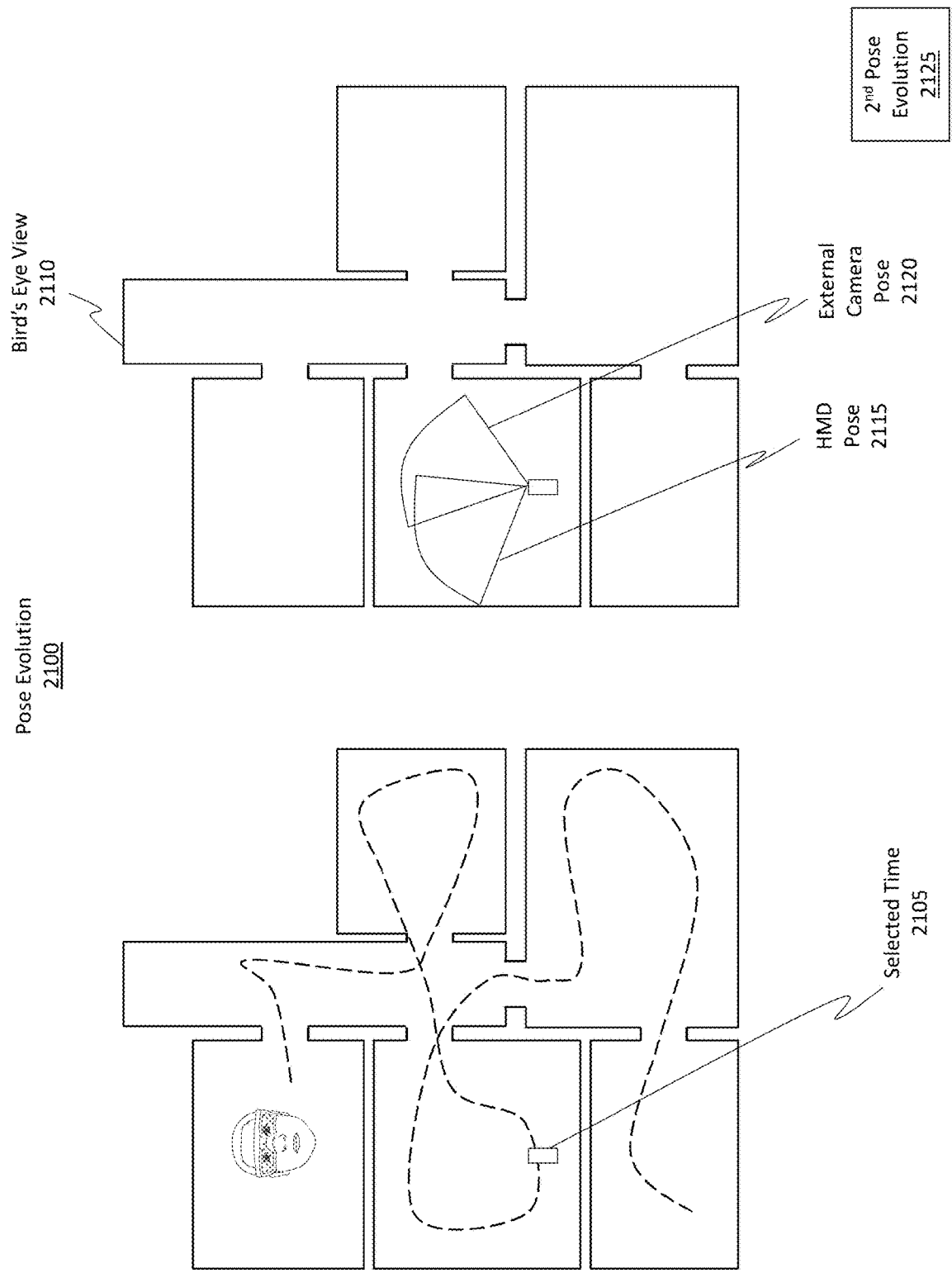
FIG. 21 illustrates how different poses from different cameras can be overlaid on top of map data.

FIG. 21 shows another illustration of a pose evolution 2100. Here, the reviewer has selected a selected time 2105 along the HMD's traveled path. In response to this selection, the embodiments are able to display a bird's eye view 2110 and the pose of the HMD, as shown by HMD pose 2115. In addition to displaying the HMD pose 2115, the embodiments can optionally also display the pose information for the external camera (e.g., a camera on a tool or gaming weapon), as shown by external camera pose 2120. In this regard, the embodiments can display information about a $2^{nd}$ pose evolution 2125. In some cases, the displayed poses may overlap while in other cases the displayed poses may not overlap. For example, if the gamer has the gaming weapon at the ready and shouldered, then it is likely that the two poses will overlap. On the other hand, if the gamer has the gaming weapon at a resting position, then the two poses likely will not overlap. When the pose evolution is displayed in video mode, then the two pose evolutions (or any number of pose evolutions) may also be displayed simultaneously with one another in the map view. Pose evolutions from other HMD users may also be displayed in the same map, provided there is a unified map.

Techniques for Generating Pose Evolutions

Figure 22:
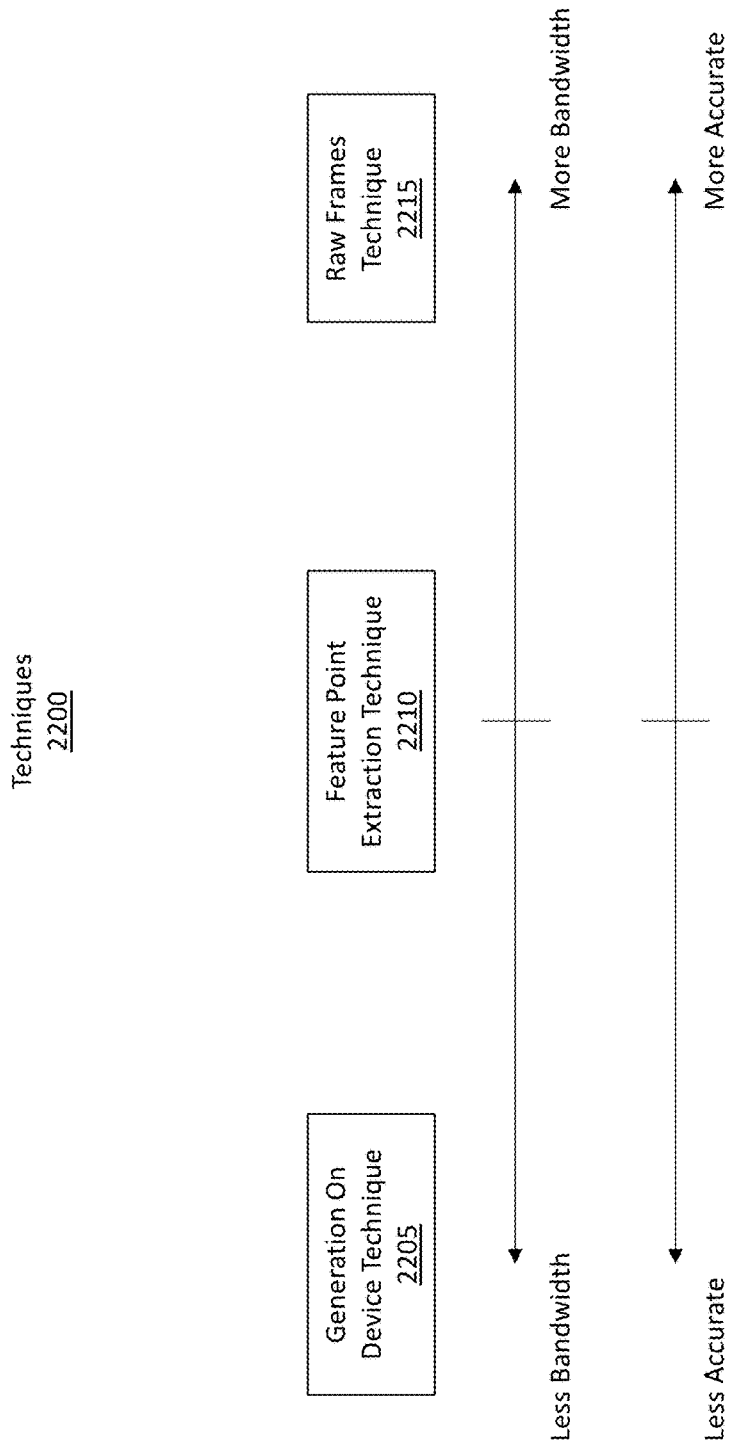
FIG. 22 outlines some example techniques that may be used to generate a pose evolution.

FIG. 22 illustrates various techniques 2200 that may be followed in order to generate the pose evolutions mentioned herein. The techniques 2200 include a generation on device technique 2205, a feature point extraction technique 2210, and a raw frames technique 2215. These techniques 2200 are arranged in FIG. 22 based on the amount of network bandwidth is consumed (relative to one another) as well as their respective accuracies (relative to one another).

Figure 23:
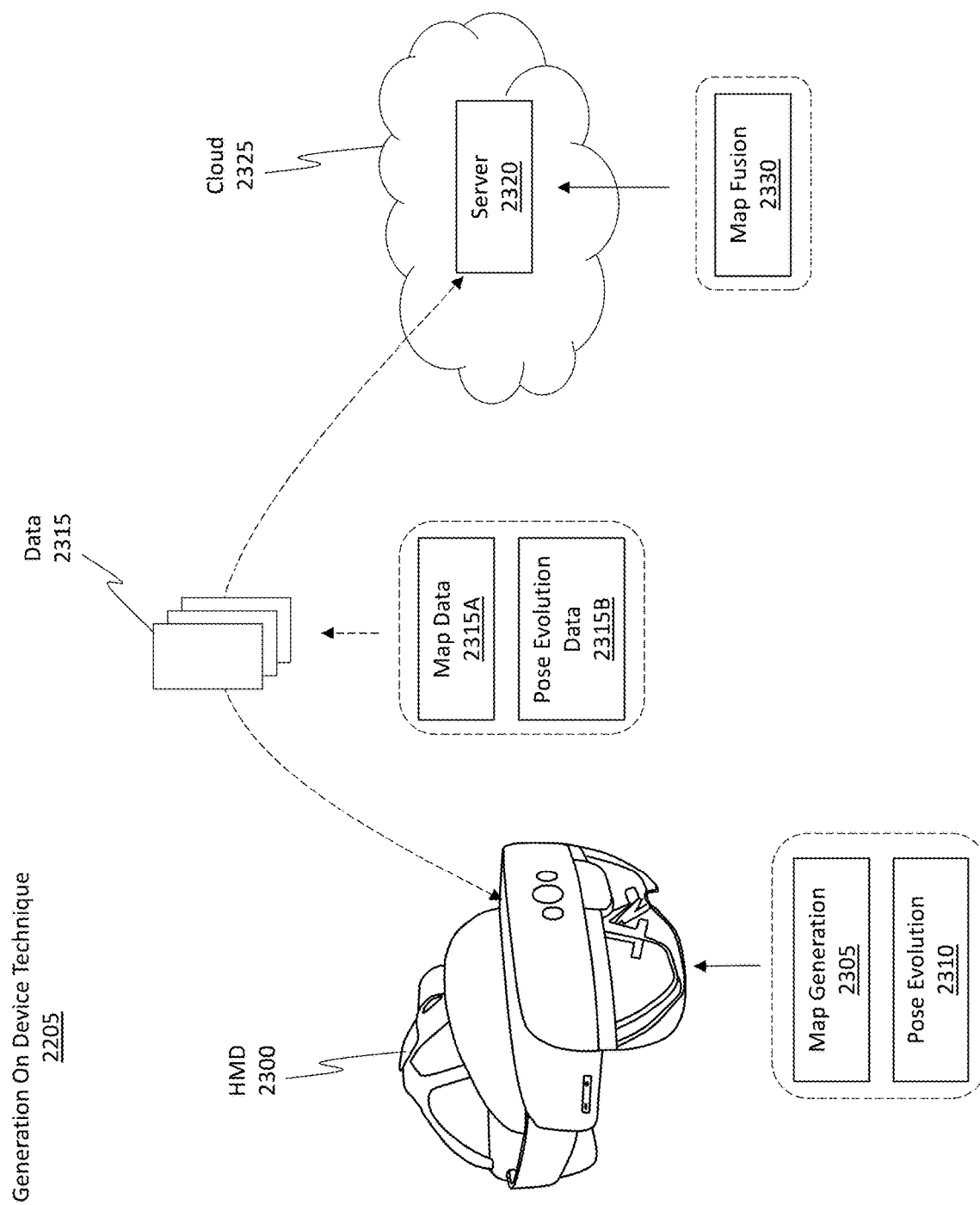
FIG. 23 illustrates a "generate on device technique" for generating a pose evolution.
Figure 24:
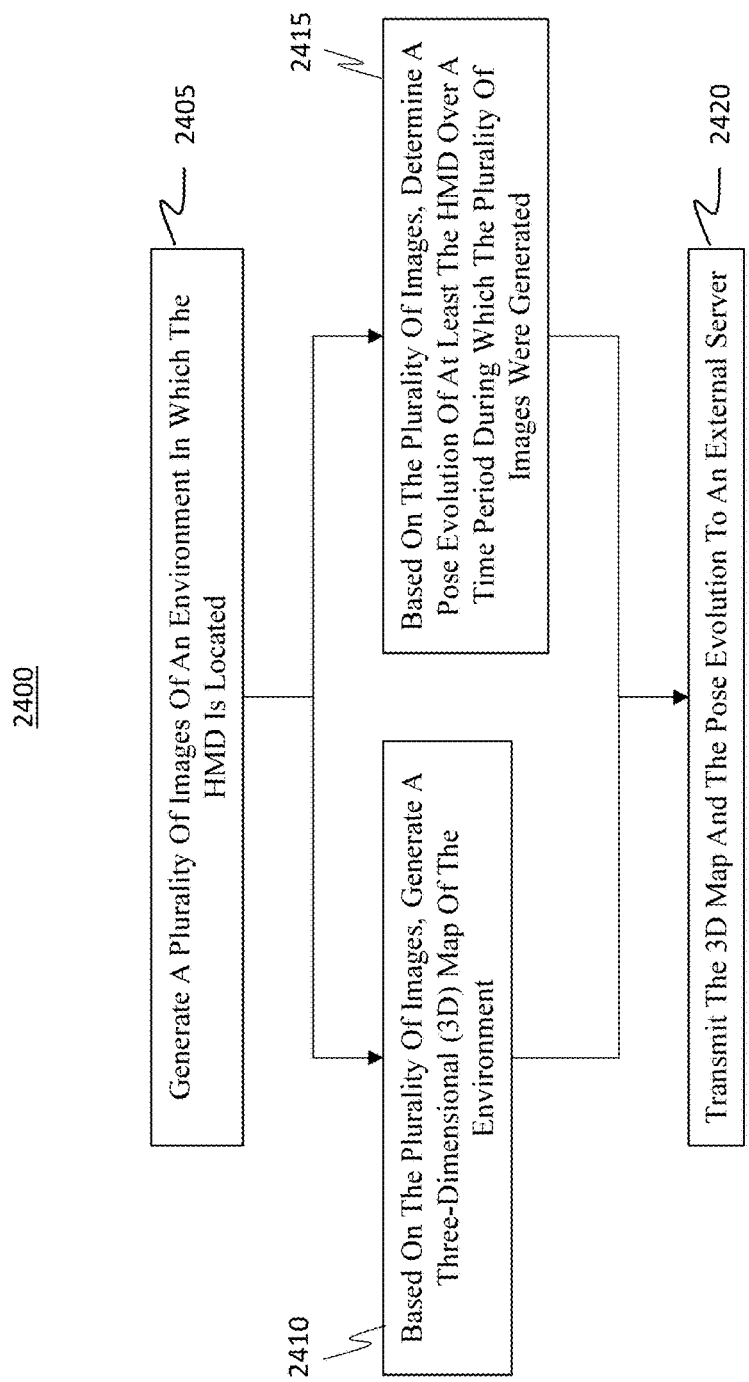
FIG. 24 illustrates a flowchart of an example method for generating a pose evolution using image data.

The generation on device technique 2205 is further clarified with reference to FIGS. 23 and 24. The feature point extraction technique 2210 is further clarified with reference to FIGS. 25, 26, and 27. The raw frames technique 2215 is further clarified with reference to FIGS. 28 and 29.

Generation on Device Technique

FIG. 23 shows the generation on device technique 2205. Here, FIG. 23 shows a HMD 2300 that is configured to generate any number of images during a particular time period, as described earlier. Based on those images, the HMD 2300 is then configured to perform a map generation 2305 process and a pose evolution 2310 generation process. That is, the HMD 2300 itself creates the 2D and 3D maps mentioned earlier during the map generation 2305 process. Additionally, the HMD 2300 generates the pose evolution 2310 based on the same images used to generate the maps.

The HMD 2300 then transmits data 2315, comprising the map data 2315A and the pose evolution data 2315B, to a server 2320 residing in a cloud 2325 environment. The server 2320 is then tasked with identifying potential path convergences between the map generated by the HMD 2300 and other maps generated by the server 2320 and/or by other HMDs. That is, the server 2320 performs a map fusion 2330 to link or combine different maps based on identified path convergences. Here, the generation on device technique 2205 consumes relatively less bandwidth as compared to the other techniques, but it is also relatively less accurate because the HMD 2300 is not as computationally powerful as the server 2320.

FIG. 24 illustrates a flowchart of an example method 2400 that is representative of the generation on device technique 2205. Method 2400 may be performed by any of the HMDs discussed thus far. In this regard, the HMD performing method 2400 is configured to generate images in order to map an environment in which the HMD is located and to determine a pose evolution of at least the HMD over a time period during which the images were generated.

Method 2400 initially includes an act (act 2405) of generating a plurality of images (e.g., a plurality of full resolution images) of an environment in which the HMD is located. Notably, the environment is a previously unmapped environment and may be a GPS denied environment.

Based on the plurality of images, there is an act (act 2410) of generating a three-dimensional (3D) map of the environment. Act 2415 is performed in serial or in parallel with act 2410. Specifically, based on the plurality of images, act 2415 involves determining a pose evolution of at least the HMD over a time period during which the plurality of images were generated. Optionally, the HMD can also determine the pose evolution of an external camera.

In some cases, the pose evolution includes a respective 6 DOF pose for multiple different timestamps included in the time period. In some cases, the pose evolution includes a respective 3 DOF pose for the different timestamps included in the time period. Optionally, a surface mesh can additionally be generated based on the images. As a consequence, both the surface mesh and the 3D map can be generated. Furthermore, the 3D map can be combined with one or more other 3D maps generated by one or more other HMDs and/or by the external server such that a combined 3D map is generated. The surface mesh can be generated based on the images and based on the combined 3D map.

The HMD then transmits (in act 2420) the 3D map and the pose evolution to an external server, such as the server 2320. The server 2320 then performs any map fusion operations based on any detected path convergences between different maps.

In some cases, the HMD also receives a set of images from an external camera. Optionally, the set of images are generated during the same time period as when the HMD images were generated. Also, the set of images are also of or portray the same environment. The HMD is able to determine a pose evolution for the external camera based on that set of images as well.

It should be noted that the 3D map and the pose evolution are progressively built as the number of images increases. That is, as more images are generated, the 3D map is expanded and the pose evolution is increased to include additional poses of the HMD. As has been discussed, the 3D map and the pose evolution are configured to be combinable with a second 3D map and a second pose evolution obtained from a second HMD.

Feature Point Extraction Technique

Figure 25:
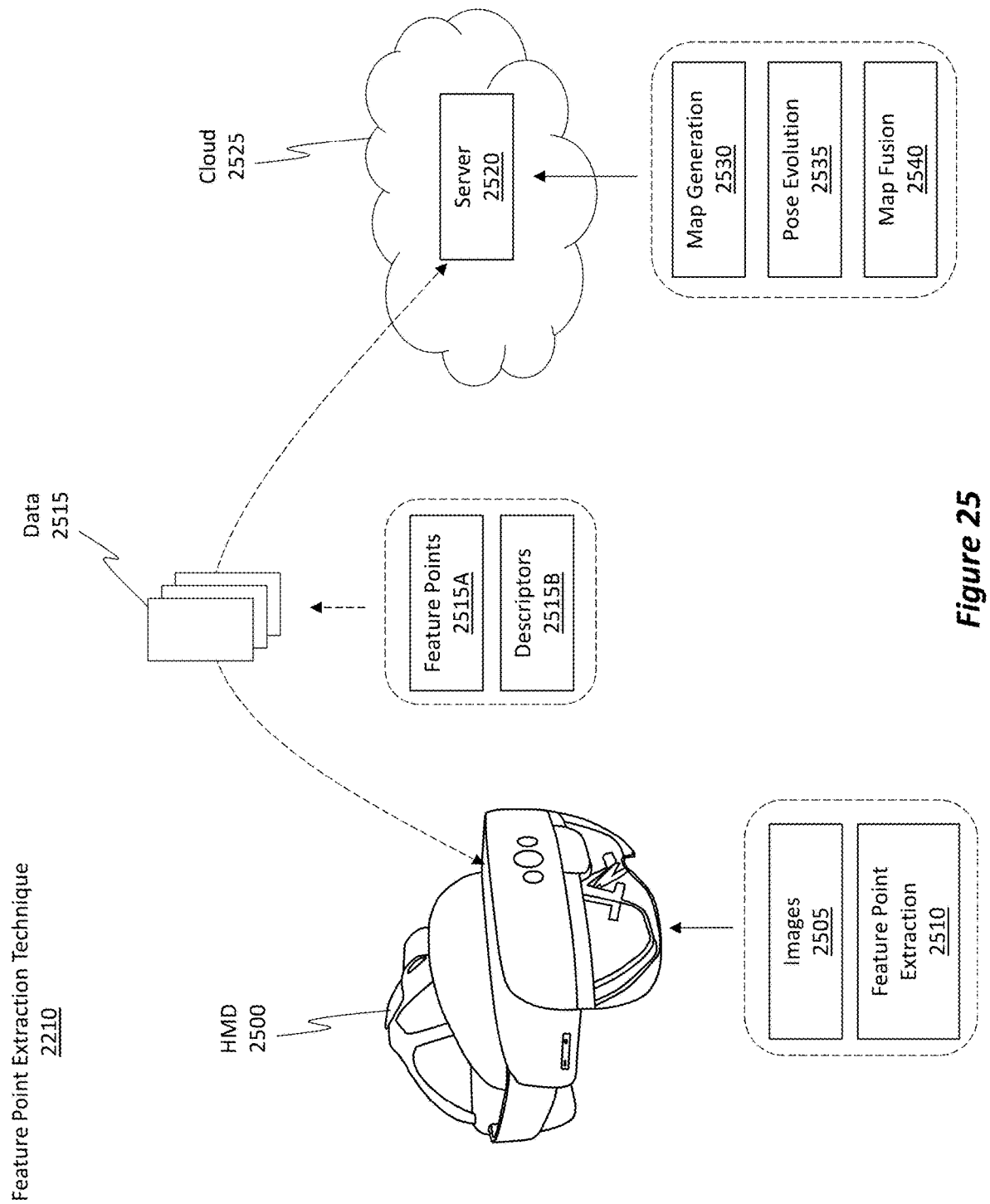
FIG. 25 illustrates a "feature point extraction technique" to generate a pose evolution.

FIG. 25 shows the feature point extraction technique 2210. Specifically, FIG. 25 shows a HMD 2500 that is configured to generate images 2505 of an environment. The HMD 2500 is also configured to perform a feature point extraction 2510 operation.

Generally, a "feature point" refers to a discrete and identifiable point included within an object or image. Examples of feature points include corners, edges, or other geometric contours having a stark contrast with other areas of the environment.

Figure 26:
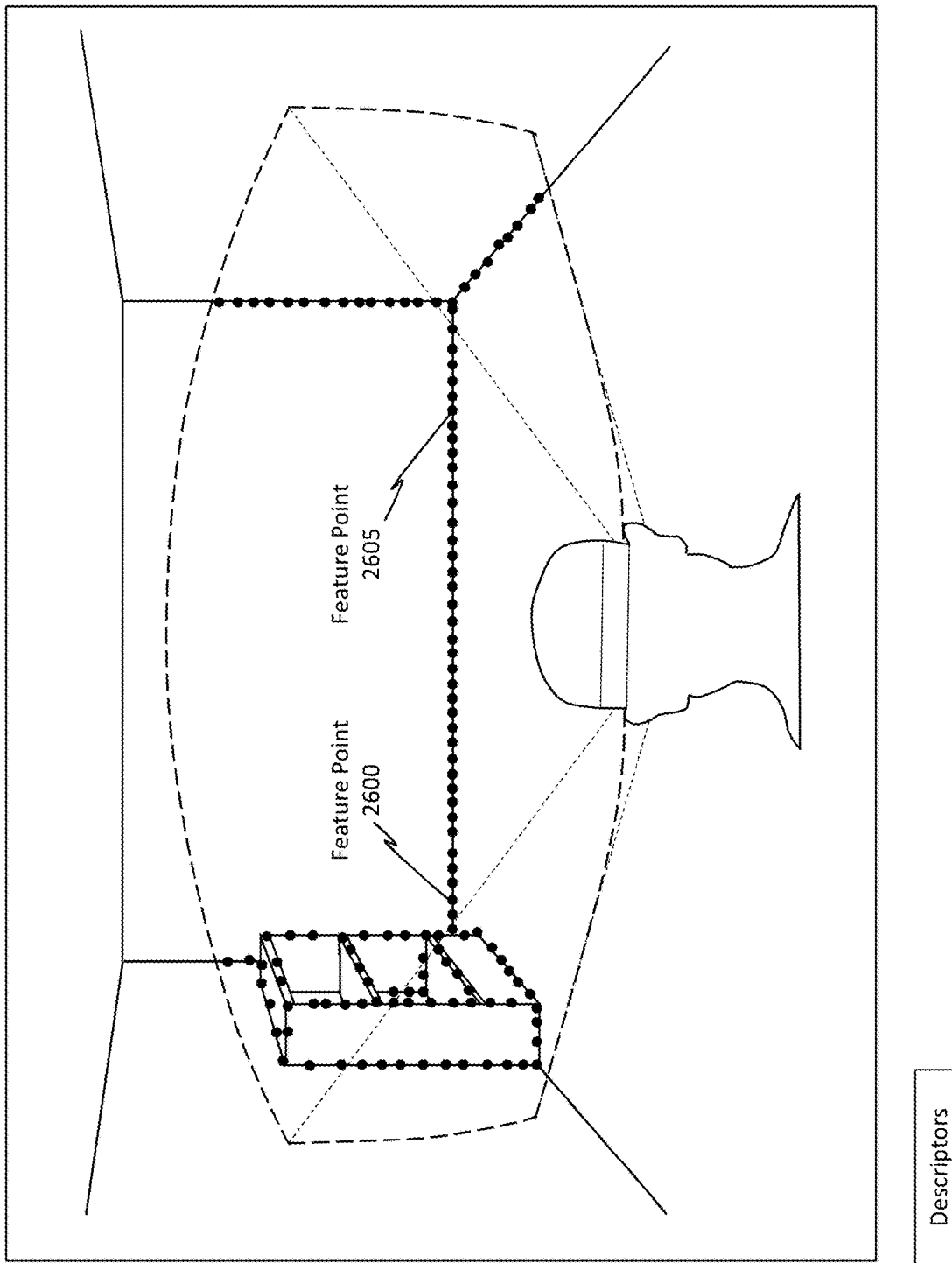
FIG. 26 illustrates how feature points can be extracted from an image.

Turning briefly to FIG. 26, FIG. 26 shows a number of feature points, including feature point 2600 and feature point 2605. The dark circles shown in FIG. 26 correspond to the corners where walls or other objects meet and where corners or discrete edges are formed and are considered to be feature points. While only a few feature points are illustrated in FIG. 26, one will appreciate how the embodiments are able to identify any number of feature points in an image (e.g., dozens, hundreds, or even thousands).

Identifying feature points may be performed using any type of image analysis, image segmentation, or perhaps even machine learning (ML). Any type of ML algorithm, model, or machine learning may be used to identify feature points. As used herein, reference to "machine learning" or to a ML model may include any type of machine learning algorithm or device, neural network (e.g., convolutional neural network(s), multilayer neural network(s), recursive neural network(s), deep neural network(s), dynamic neural network (s), etc.), decision tree model(s) (e.g., decision trees, random forests, and gradient boosted trees), linear regression model (s) or logistic regression model(s), support vector machine (s) ("SVM"), artificial intelligence device(s), or any other type of intelligent computing system. Any amount of training data may be used (and perhaps later refined) to train the machine learning algorithm to dynamically perform the disclosed operations.

In addition to identifying feature points, the embodiments are also able to generate feature point descriptors, or simply descriptors 2610, for each identified feature point. A feature point descriptor (e.g., descriptor 2610) is a compact representation of pixel information associated with a particular feature point and acts as an encoded fingerprint for the particular feature point. The descriptors 2610 may include a pixel intensity histogram outlining the different pixels, or rather the pixels for the different feature points. Accordingly, the embodiments are able to perform a feature point extraction 2510 process on the HMD's images to identify the feature points.

Returning to FIG. 25, the HMD 2500 transmits data 2515, which includes the feature points 2515A and the descriptors 2515B generated during the feature point extraction 2510 process, to a server 2520 located in a cloud 2525 environment. The server 2520 can then perform a map generation 2530 process and a pose evolution 2535 generation process using the data 2515. Optionally, the server 2520 can combine the resulting map with other maps based on a determination as to whether a path convergence exists, as shown by map fusion 2540.

Figure 27:
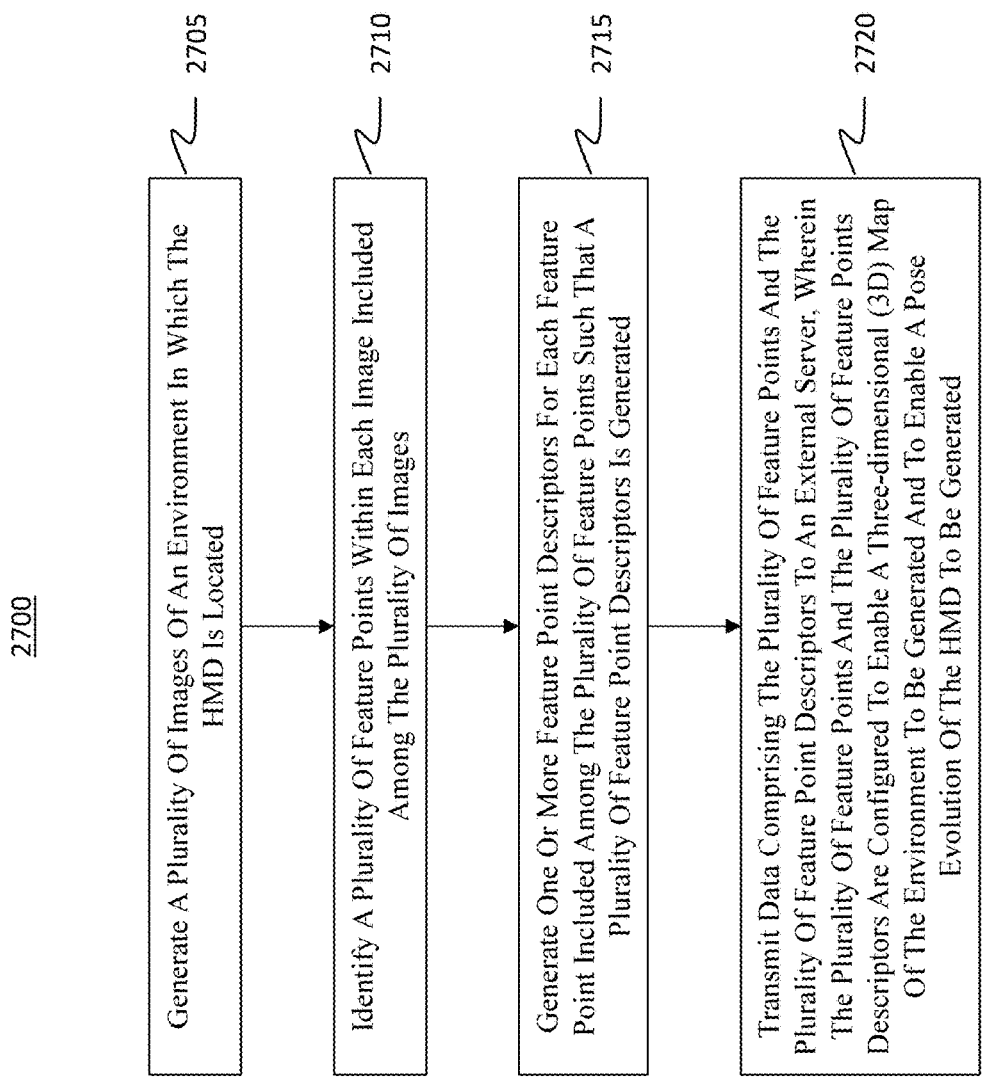
FIG. 27 illustrates a flowchart of an example method for generating a pose evolution using feature points and descriptors.

FIG. 27 illustrates a flowchart of an example method 2700 representative of the feature point extraction technique 2210. Method 2700 may be performed by any of the disclosed HMDs.

Initially, method 2700 includes an act (act 2705) of generating a plurality of images of an environment in which the HMD is located. Act 2710 then includes identifying a plurality of feature points within each image included among the plurality of images.

Method 2700 includes an act (act 2715) of generating one or more feature point descriptors for each feature point included among the plurality of feature points. Consequently, a plurality of feature point descriptors is generated.

There is then an act (act 2720) of transmitting data comprising the plurality of feature points and the plurality of feature point descriptors to an external server. Therefore, in contrast to the generation on device technique 2205, which transferred already generated map data and already generated pose evolution data, this process involves transferring feature points and descriptors to enable the external server to generate the map and pose evolutions. To clarify, the plurality of feature points and the plurality of feature points descriptors are configured to enable a three-dimensional (3D) map of the environment to be generated by the external server and to enable a pose evolution of the HMD to be generated by the external server.

By way of additional clarification, the HMD refrains from generating the map of the environment and also refrains from generating the pose evolution. Instead, the server generates those pieces of information. The feature point extraction technique 2210 is more accurate than the generation on device technique 2205 (because the server is more computationally powerful than the HMD and thus can better process the data) but consumes more bandwidth (because more data is being transmitted). Optionally, the HMD may generate a sparse surface reconstruction mesh from the feature points. As another option, the server may generate the sparse surface reconstruction mesh.

Raw Frames Technique

Figure 28:
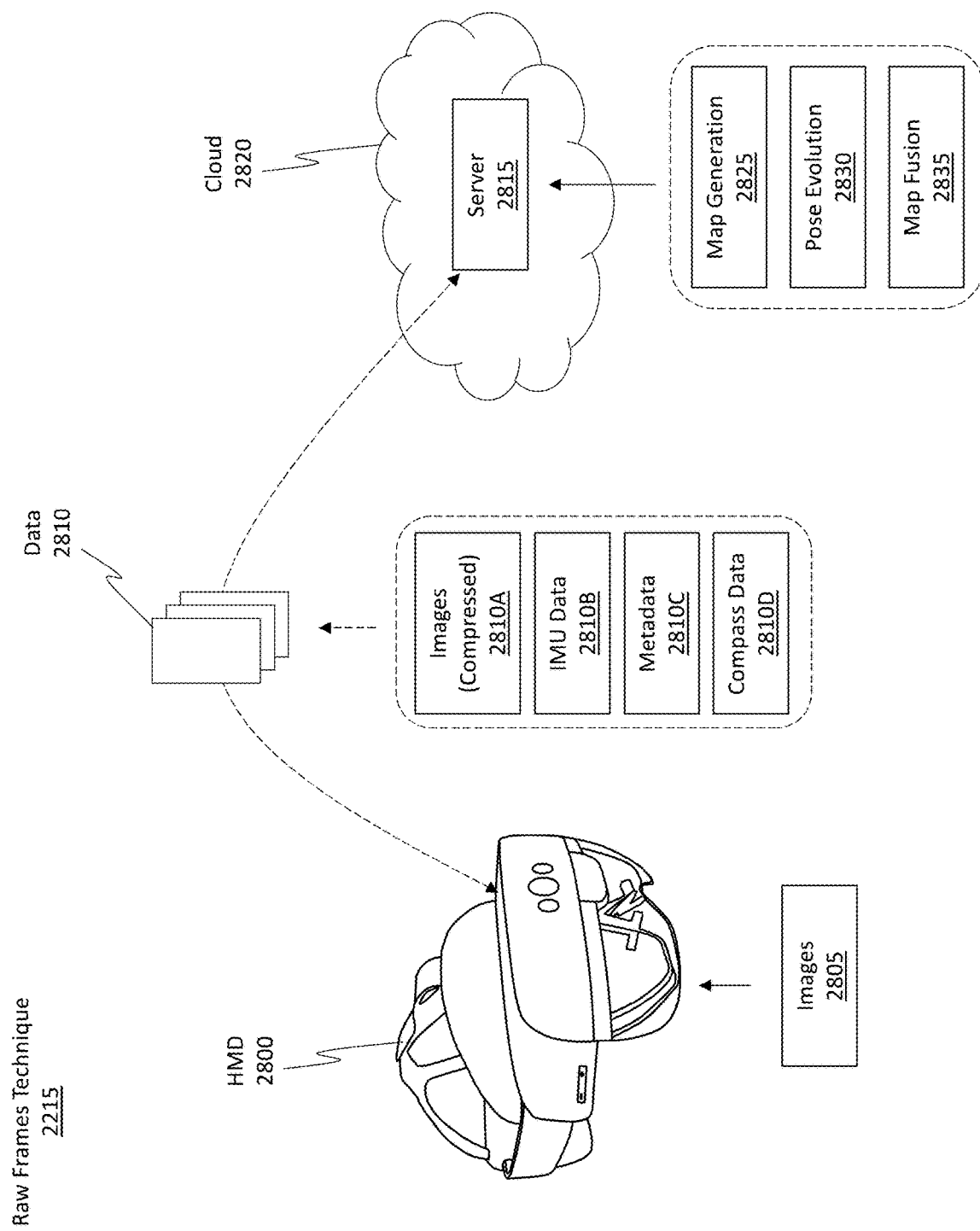
FIG. 28 illustrates a "raw frames technique" for generating a pose evolution.

FIG. 28 shows an HMD 2800, which is representative of the HMDs discussed thus far. As discussed, the HMD 2800 is configured to generate any number of images 2805 as the HMD 2800 travels through different areas of an environment. The HMD 2800 transmits data 2810 to a server 2815 operating in a cloud 2820 environment. The data 2810 may include images 2810A (perhaps in a compressed state), IMU data 2810B of the HMD 2800, metadata 2810C (e.g., timestamp information), and perhaps even compass data 2810D. The data 2810 may be transmitted in batches (e.g., multiple images, IMU data, etc. all transmitted at the same time at a periodic frequency) or the data 2810 may be continuously streamed, with new data being streamed as it is generated.

The server 2815 receives the data 2810 and then performs a number of operations on that data. For example, using the data 2810, the server 2815 is able to perform a map generation 2825 process in which the server 2815 uses at least the images to generate the 2D and 3D maps of the environment. Additionally, the server 2815 uses the data 2810 to generate a pose evolution 2830 of the HMD 2800 over time. If the server 2815 receives data from multiple different HMDs and if the server 2815 detects a path convergence between the different maps that are generated, then the server 2815 can perform a map fusion 2835 process to link or combine the different maps based on the path convergence. Accordingly, for the raw frames technique 2215, the server 2815 is the entity that generates the maps and the pose evolutions. Such a process is highly accurate because the server 2815 (i.e. a high compute ability device) is able to generate maps based on the raw image data. Such a process also consumes a high amount of bandwidth, however, because transmitting raw images is bandwidth intensive.

Figure 29:
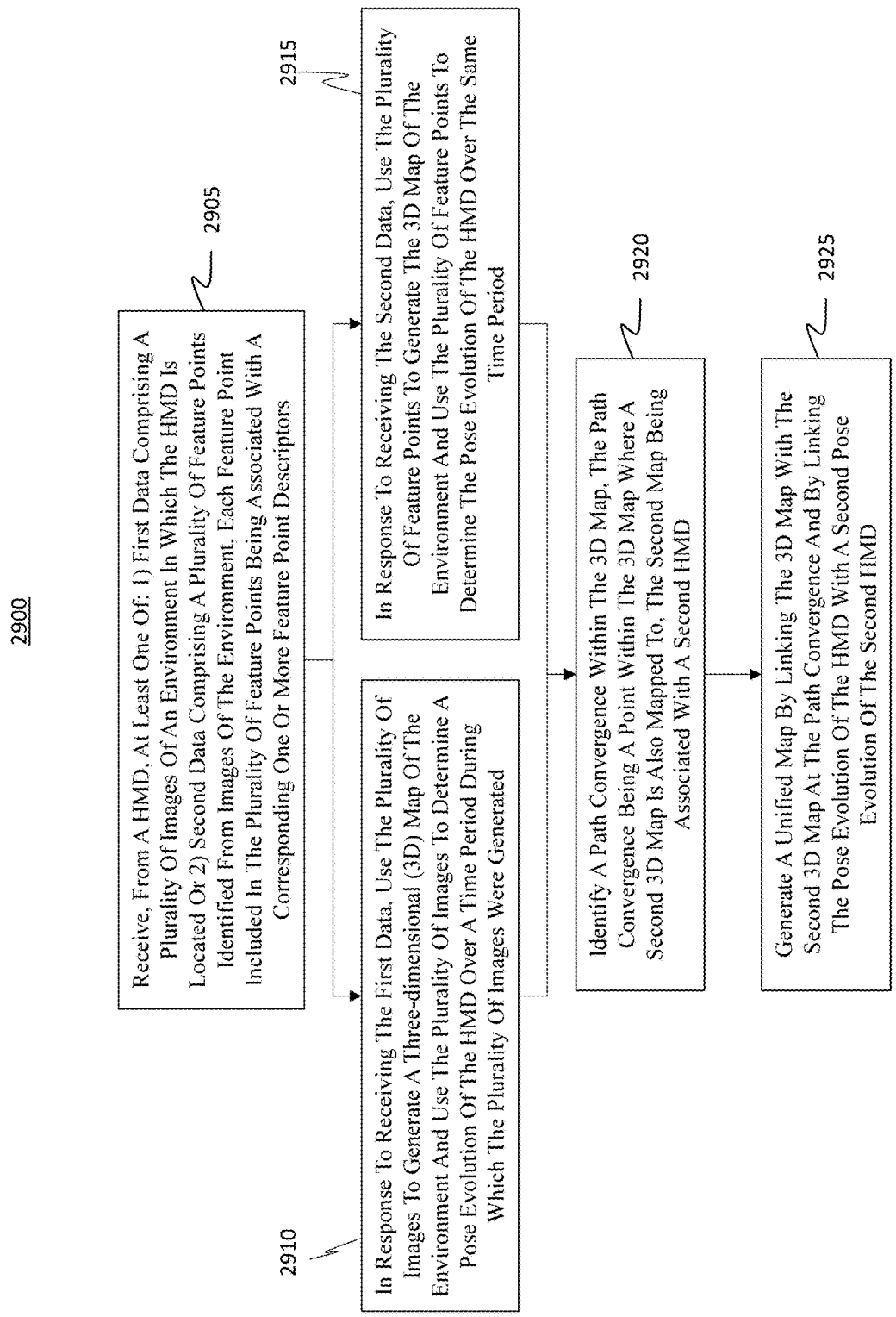
FIG. 29 illustrates a flowchart of an example method for generating a pose evolution.

FIG. 29 shows a flowchart of an example method 2900 for processing images in order to map an environment in which a HMD is located and for determining a pose evolution of at least the HMD over a time period during which the images were generated. Method 2900 may be performed by the server 2815 of FIG. 28.

Initially, there is an act (act 2905) of receiving, from a HMD (e.g., HMD 2800 of FIG. 28), at least one of: 1) first data comprising a plurality of images of an environment in which the HMD is located or 2) second data comprising a plurality of feature points identified from images of the environment. Each feature point included in the plurality of feature points is associated with a corresponding one or more feature point descriptors, as described earlier.

In response to receiving the first data, act 2910 includes using the plurality of images to generate a three-dimensional (3D) map of the environment and using the plurality of images to determine a pose evolution of the HMD over a time period during which the plurality of images were generated.

In response to receiving the second data, act 2915 includes using the plurality of feature points to generate the 3D map of the environment and using the plurality of feature points to determine the pose evolution of the HMD over the same time period.

The pose evolution includes multiple poses that are determined for the HMD over the time period. Each pose includes or is associated with its own corresponding timestamp. Optionally, the poses are periodic and are computed every "x" milliseconds. As a consequence, the timestamps for the poses are every "x" milliseconds apart from one another. Here, "x" may be any value, without limit (e.g., 1 ms, 10 ms, 100 ms, 1,000 ms, etc.). Optionally, the frequency of the poses is variable, perhaps dependent on events identified within the environment. In some cases, a bird's eye view is generated to display the pose evolution.

Act 2920 then includes identifying a path convergence within the 3D map. The path convergence is a point within the 3D map where a second 3D map is also mapped to. Notably, the second map is associated with a second HMD.

Act 2925 then includes generating a unified map by linking the 3D map with the second 3D map at the path convergence and by linking the pose evolution of the HMD with a second pose evolution of the second HMD. Accordingly, in the raw frames technique 2215, the external server generates the maps and the pose evolutions.

By way of additional clarification, not only does the server 2815 receive the raw image data and/or the feature point data from the HMD, but the server 2815 also receives a map and/or data usable to generate a map (e.g., raw image data, feature points, etc.) from the second HMD. The server generates the respective maps and identifies any path convergences. The server also performs a map to map alignment between the 3D map and the second map based on the identified path convergence. By map to map alignment, it is generally meant that the XYZ coordinate systems of the maps are aligned with one another.

In this manner, the disclosed embodiments substantially improve how maps are generated. The embodiments also improve how after action reviews are performed through the use of pose evolutions. These pose evolutions are highly accessible and are able to provide reviewers with enhanced information.

Example Computer/Computer Systems

Figure 30:
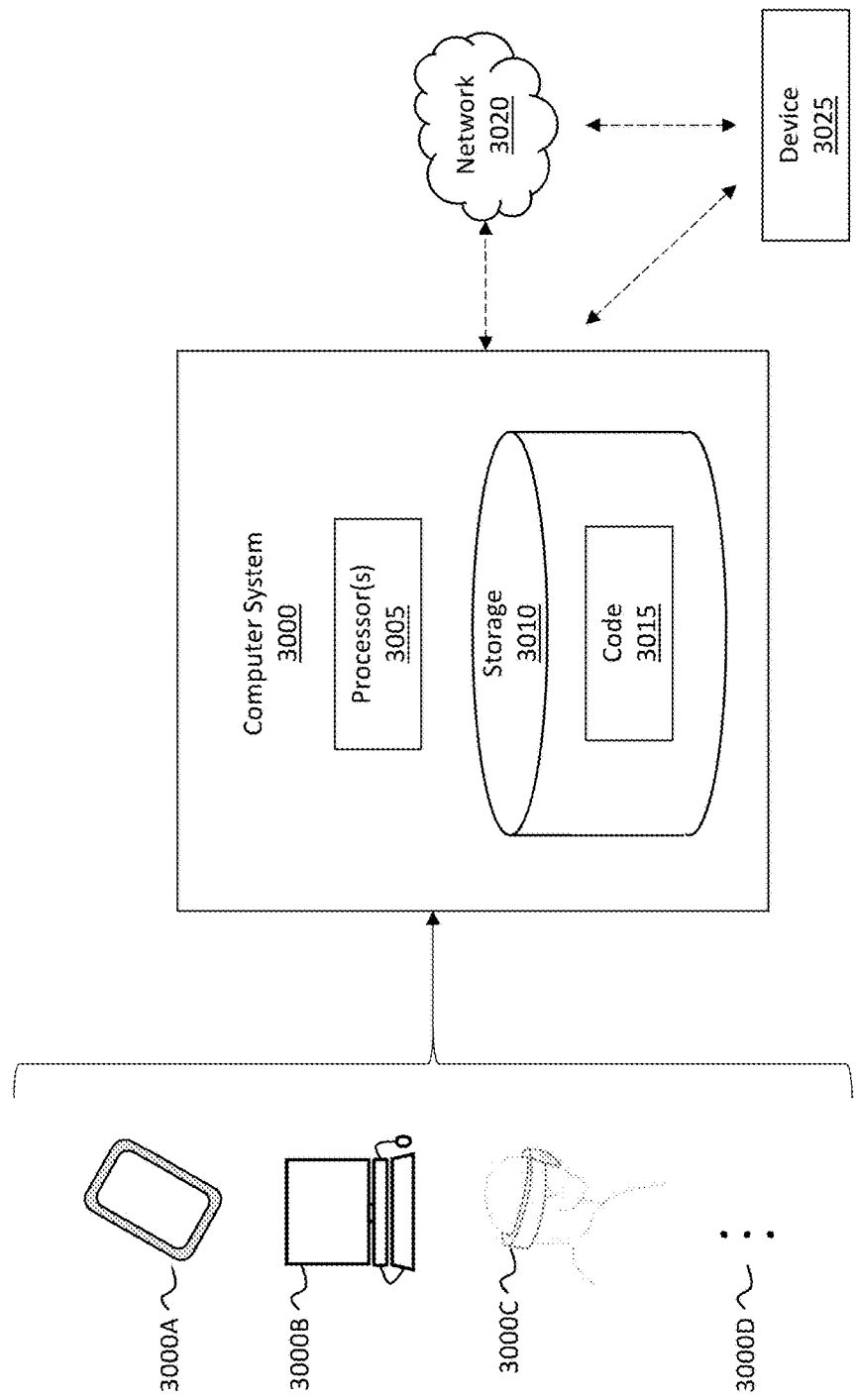
FIG. 30 illustrates an example computer system capable of performing any of the disclosed operations.

Attention will now be directed to FIG. 30 which illustrates an example computer system 3000 that may include and/or be used to perform any of the operations described herein. Computer system 3000 may take various different forms. For example, computer system 3000 may be embodied as a tablet 3000A, a desktop or laptop 3000B, a wearable HMD 3000C, a mobile device, or any other type of standalone device, as represented by the ellipsis 3000D. Computer system 3000 may also be a distributed system that includes one or more connected computing components/devices that are in communication with computer system 3000.

In its most basic configuration, computer system 3000 includes various different components. FIG. 30 shows that computer system 3000 includes one or more processor(s) 3005 (aka a "hardware processing unit") and storage 3010. As discussed previously, the computer system 3000 may also include any number or type of cameras.

Regarding the processor(s) 3005, it will be appreciated that the functionality described herein can be performed, at least in part, by one or more hardware logic components (e.g., the processor(s) 3005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Storage 3010 may be physical system memory, which may be volatile, non-volatile, or some combination of the two. The term "memory" may also be used herein to refer to non-volatile mass storage such as physical storage media. If computer system 3000 is distributed, the processing, memory, and/or storage capability may be distributed as well.

Storage 3010 is shown as including executable instructions (i.e. code 3015). The executable instructions represent instructions that are executable by the processor(s) 3005 of computer system 3000 to perform the disclosed operations, such as those described in the various methods.

The disclosed embodiments may comprise or utilize a special-purpose or general-purpose computer including computer hardware, such as, for example, one or more processors (such as processor(s) 3005) and system memory (such as storage 3010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 3000 may also be connected (via a wired or wireless connection) to external sensors (e.g., one or more remote cameras) or devices via a network 3020 (e.g., see the connection with device 3025). For example, computer system 3000 can communicate with any number devices (e.g., device 3025) or cloud services to obtain or process data. In some cases, network 3020 may itself be a cloud network. Furthermore, computer system 3000 may also be connected through one or more wired or wireless networks 3020 to remote/separate computer systems(s) that are configured to perform any of the processing described with regard to computer system 3000. Device 3025 may be any of the other HMDs discussed herein.

A "network," like network 3020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 3000 will include one or more communication channels that are used to communicate with the network 3020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A head mounted device (HMD) configured to generate a plurality of images in order to map an environment in which the HMD is located and to determine a pose evolution of at least the HMD over a time period during which the plurality of images were generated, said HMD comprising:
   one or more processors; and one or more computer-readable hardware storage devices that store instructions that are executable by the one or more processors to cause the HMD to at least:

generate the plurality of images of an environment in which the HMD is located, the environment being a previously unmapped environment;

based on the plurality of images, generate a three-dimensional (3D) map of the environment;

based on the plurality of images, determine a pose evolution of at least the HMD over a time period during which the plurality of images were generated; and transmit the 3D map and the pose evolution to an external server.

2. The HMD of claim 1, wherein the pose evolution includes a respective 6 degree of freedom (DOF) pose for a plurality of different timestamps included in the time period.

3. The HMD of claim 1, wherein the pose evolution includes a respective 3 degree of freedom (DOF) pose for a plurality of different timestamps included in the time period.

4. The HMD of claim 1, wherein:
the 3D map is combined with one or more other 3D maps generated by one or more other HMDs and/or by the external server such that a combined 3D map is generated, and
a surface mesh is generated based on the plurality of images and based on the combined 3D map.

5. The HMD of claim 1, wherein the HMD receives a set of images from an external camera, the set of images being generated during the same time period as the plurality of images, the set of images also being of the environment, and wherein the HMD further determines a pose evolution for the external camera based on the set of images.

6. The HMD of claim 1, wherein the environment is a global positioning system (GPS) denied environment.

7. The HMD of claim 1, wherein the 3D map and the pose evolution are progressively built as a number of images included in the plurality of images increases.

8. The HMD of claim 1, wherein the 3D map and the pose evolution are configured to be combinable with a second 3D map and a second pose evolution obtained from a second HMD.

9. A head mounted device (HMD) configured to generate a plurality of images in order to enable a map an environment in which the HMD is located to be generated and to enable a pose evolution of at least the HMD to be generated, where the pose evolution describes poses of the HMD over a time period during which the plurality of images were generated, said HMD comprising:
one or more processors; and
one or more computer-readable hardware storage devices that store instructions that are executable by the one or more processors to cause the HMD to at least:
generate the plurality of images of an environment in which the HMD is located;
identify a plurality of feature points within each image included among the plurality of images;
generate one or more feature point descriptors for each feature point included among the plurality of feature points such that a plurality of feature point descriptors is generated;
transmit data comprising the plurality of feature points and the plurality of feature point descriptors to an external server, wherein the plurality of feature points and the plurality of feature points descriptors are configured to enable a three-dimensional (3D) map of the environment to be generated and to enable a pose evolution of the HMD to be generated.

10. The HMD of claim 9, wherein the plurality of images are a plurality of full resolution images, and wherein the HMD refrains from transmitting the plurality of full resolution images to the external server.

11. The HMD of claim 9, wherein the HMD refrains from generating the map of the environment, and wherein the HMD refrains from generating the pose evolution.

12. The HMD of claim 9, wherein a feature point descriptor is a compact representation of pixel information associated with a particular feature point and acts as an encoded fingerprint for the particular feature point.

13. The HMD of claim 9, wherein the HMD generates a sparse surface reconstruction mesh from the plurality of feature points.

14. The HMD of claim 9, wherein the 3D map and the pose evolution are configured to be combinable with a second 3D map and a second pose evolution obtained from a second HMD.

15. A computer system configured process images in order to map an environment in which a head mounted device (HMD) is located and to determine a pose evolution of at least the HMD over a time period during which the images were generated, said computer system comprising:
one or more processors; and
one or more computer-readable hardware storage devices that store instructions that are executable by the one or more processors to cause the computer system to at least:
receive, from a HMD, at least one of: 1) first data comprising a plurality of images of an environment in which the HMD is located or 2) second data comprising a plurality of feature points identified from images of the environment, each feature point included in the plurality of feature points being associated with a corresponding one or more feature point descriptors;
in response to receiving the first data, use the plurality of images to generate a three-dimensional (3D) map of the environment and use the plurality of images to determine a pose evolution of the HMD over a time period during which the plurality of images were generated;
in response to receiving the second data, use the plurality of feature points to generate the 3D map of the environment and use the plurality of feature points to determine the pose evolution of the HMD over the same time period;
identify a path convergence within the 3D map, the path convergence being a point within the 3D map where a second 3D map is also mapped to, the second map being associated with a second HMD; and
generate a unified map by linking the 3D map with the second 3D map at the path convergence and by linking the pose evolution of the HMD with a second pose evolution of the second HMD.

16. The computer system of claim 15, wherein a feature point descriptor is a compact representation of pixel information associated with a particular feature point and acts as an encoded fingerprint for the particular feature point.

17. The computer system of claim 15, wherein the pose evolution includes a plurality of poses that are determined for the HMD over the time period.

18. The computer system of claim 17, wherein each pose in the plurality of poses includes a corresponding timestamp.

19. The computer system of claim 18, wherein the poses in the plurality of poses are periodic and are computed every x milliseconds such that the timestamps for the poses are every x milliseconds apart from one another.

20. The computer system of claim 15, wherein:
a bird's eye view is generated to display the pose evolution,
the second map is shared with the computer system by the second HMD, and
the computer system performs a map to map alignment between the 3D map and the second map based on the identified path convergence.

\* \* \* \* \*